US012776954B2

(12) United States Patent
Warren et al.

(10) Patent No.: US 12,776,954 B2
(45) Date of Patent: Oct. 27, 2026

(54) IN-SWITCH COLLECTIVE PRIMITIVE PROCESSING

(71) Applicant: Samsung Electronics Co., Ltd., Suwon-si (KR)

(72) Inventors: Bruce Gregory Warren, Poulsbo, WA (US); Rohit Bhatia, Fort Collins, CO (US); Eric Richard Borch, Fort Collins, CO (US); Douglas Joseph, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 205 days.

(21) Appl. No.: 18/829,277

(22) Filed: Sep. 9, 2024

(65) Prior Publication Data

US 2025/0267065 A1 Aug. 21, 2025

Related U.S. Application Data

(60) Provisional application No. 63/554,932, filed on Feb. 16, 2024.

(51) Int. Cl.
*H04L 41/0893* (2022.01)

(52) U.S. Cl.
CPC ................................ *H04L 41/0893* (2013.01)

(58) Field of Classification Search
CPC . H04L 41/0893; H04L 45/46; H04L 41/0895; H04L 45/42; H04L 45/566; H04L 41/0803; H04L 12/4633; H04L 12/4641; H04L 45/04; H04L 45/122; H04L 45/123; H04L 45/586; H04L 41/0813; H04L 41/0816; H04L 41/40; H04L 45/64; H04L 47/125; H04L 49/109; H04L 49/254; H04L 49/70; H04L 67/10; H04L 67/1012; H04L 69/06
See application file for complete search history.

(56) References Cited

U.S. PATENT DOCUMENTS 8,804,488 B2 * 8/2014 Archer .................... G06F 9/541 370/216
8,904,118 B2 * 12/2014 Mamidala ........... G06F 12/0831 711/147
8,958,419 B2 * 2/2015 Cummings ........... H04L 49/254 370/360
10,425,358 B2 9/2019 Chen et al.
(Continued)

*Primary Examiner* — Chris Parry
*Assistant Examiner* — Abderrahmen Chouat
(74) *Attorney, Agent, or Firm* — Renaissance IP Law Group LLP

(57) ABSTRACT

Provided are systems, methods, and apparatuses for distributed, in-switch collective processing. In one or more examples, the systems, devices, and methods include configuring the group of collective engines as one or more logical collective engines. The systems, devices, and methods include distributing a collective message from the source node to a master engine of all, or some portion of, the group of collective engines, and the collective engines exchanging one or more collective messages with participating engines and end nodes of the collective to satisfy the collective operation. Multiple collective contexts may be supported simultaneously with either the same or a different collective engine instance serving as the master instance for a given collective context.

20 Claims, 10 Drawing Sheets

(56) References Cited

U.S. PATENT DOCUMENTS

| | | | | |
|---|---|---|---|---|
| 11,099,902 | B1 | 8/2021 | Matthews et al. | |
| 11,262,824 | B2 | 3/2022 | Johnsen et al. | |
| 11,818,033 | B2 | 11/2023 | Wu et al. | |
| 2011/0283017 | A1* | 11/2011 | Alkhatib | H04L 12/4633 718/1 |
| 2023/0060053 | A1* | 2/2023 | Zhang | G06F 9/5027 |
| 2023/0106425 | A1* | 4/2023 | Lu | H04L 45/566 709/238 |
| 2025/0080411 | A1* | 3/2025 | Goliya | H04L 41/0803 |

* cited by examiner

IN-SWITCH COLLECTIVE PRIMITIVE PROCESSING

CROSS-REFERENCE TO RELATED APPLICATIONS

This application claims the benefit of U.S. Provisional Patent Application Ser. No. 63/554,932, filed Feb. 16, 2024, which is incorporated by reference herein for all purposes.

TECHNICAL FIELD

The disclosure relates generally to high-performance computing (HPC). In particular, the subject matter relates to in-switch collective primitive processing associated with HPC.

BACKGROUND

The present background section is intended to provide context only, and the disclosure of any concept in this section does not constitute an admission that said concept is prior art.

Computer networking is the process of connecting computing devices so they can share resources and exchange data. These devices can be connected using physical wires, like fiber optics, or wirelessly. High performance computing (HPC) is the practice of combining computing resources to solve complex problems that require a lot of computing power. HPC systems can perform calculations and process data at speeds that are millions of times faster than a standard computer, laptop, or server. HPC can take the form of custom-built supercomputers or groups of individual computers (e.g., clusters).

SUMMARY

In various embodiments, the systems and methods described herein include systems, methods, and apparatuses for in-switch collective primitive processing. In some aspects, the systems and methods described herein relate to a first switch including: a source node to: communicate configuration information to a group of collective engines, the group of collective engines being configured as a distributed collective engine of a first collective operation, the configuration information indicating the source node is a master node of the first collective operation and that a local node of the first switch and a remote node of a second switch are subordinate to the source node in the first collective operation; distribute a collective command to the group of collective engines; and a master collective engine to: receive the configuration information from the source node; and exchange one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

In some aspects, the techniques described herein relate to a first switch, wherein: communication between the second collective engine and the master collective engine includes one hop based on the second switch being connected to the first switch, and communication between the third collective engine and the master collective engine includes two hops based on the third switch connecting to the first switch via the second switch.

In some aspects, the techniques described herein relate to a first switch, wherein distributing the collective command to the group of collective engines is based on: the source node providing the collective command to the master collective engine, and the master collective engine replicating the collective command and distributing the replicated collective command to the group of subservient collective engines.

In some aspects, the techniques described herein relate to a first switch, wherein the master collective engine is further configured to distribute a copy of the replicated collective command to one or more subordinate nodes of the first switch, the first switch including at least the source node and the one or more subordinate nodes, the one or more subordinate nodes including the local node of the first switch.

In some aspects, the techniques described herein relate to a first switch, wherein the master collective engine is further configured to: receive, based on the collective command, a plurality of partial results from the group of collective engines and one or more subordinate nodes of the first switch; communicate a consolidated response to the source node based on receipt of the plurality of partial results; distribute a final result to the group of subservient collective engines.

In some aspects, the techniques described herein relate to a first switch, wherein the master collective engine is further configured to distribute the final result to the one or more subordinate nodes of the first switch, including the local node of the first switch.

In some aspects, the techniques described herein relate to a first switch, wherein receiving the plurality of partial results includes the master collective engine receiving a first response to the collective command from the local node of the first switch and the master collective engine providing the first response to the source node, the first response including at least a first partial result of the first collective operation from the local node of the first switch.

In some aspects, the techniques described herein relate to a first switch, wherein receiving the plurality of partial results includes the master collective engine receiving a second response to the collective command from the second switch and the master collective engine providing the second response to the source node, the second response including a second partial result of the first collective operation from a remote node of the second switch.

In some aspects, the techniques described herein relate to a first switch, wherein: the second response includes a third partial result of the first collective operation from a remote node of the third switch based on the third switch providing a third response to the collective command to the second switch and the third response including the third partial result of the first collective operation, and the second response includes a fourth partial result of the first collective operation from a remote node of a fourth switch based on the fourth switch providing a fourth response to the collective command to the third switch, the third switch providing the fourth response to the collective command to the second switch, and the fourth response including the fourth partial result of the first collective operation.

In some aspects, the techniques described herein relate to a first switch, wherein: the configuration information configures the second collective engine to distribute a copy of the replicated collective command to the third switch and to one or more nodes of the second switch; and the configuration information configures the third collective engine to distribute a copy of the replicated collective command to one or more nodes of the third switch.

In some aspects, the techniques described herein relate to a first switch, wherein the configuration information includes at least one of: a device ID of the local node of the first switch, a device ID of the remote node of the second switch, a participant ID associated with the device ID of the local node, a participant ID associated with the device ID of the remote node, a device ID of a packet engine that is subservient to the first switch, a physical port of an inner-switch link of the first switch, a timeout of the first switch different from a timeout of the second switch, a protocol validation configuration, or an error reporting configuration.

In some aspects, the techniques described herein relate to a first switch, the master collective engine is further configured to: receive, from the source node, an initialization packet, the initialization packet assigning to the first switch a collective group identifier (ID) of the first collective operation; forward a first copy of the initialization packet to the second switch; and forward a second copy of the initialization packet to the local node of the first switch.

In some aspects, the techniques described herein relate to a first switch, wherein: at least one collective engine of the group of collective engines is configured as an addressable endpoint of the first collective operation, the addressable endpoint enables the group of subservient collective engines to determine context ownership of the first collective operation, and the addressable endpoint enables the master collective engine to configure traffic patterns of the first collective operation.

In some aspects, the techniques described herein relate to a first switch, wherein the one or more collective messages includes at least one of a posted message or a non-posted message.

In some aspects, the techniques described herein relate to a first switch, wherein the first switch further includes: a second local node subordinate to a source node of a fourth switch that is associated with executing a second collective operation different from the first collective operation, the second local node being configured to provide a partial result of the second collective operation to the source node of the fourth switch.

In some aspects, the techniques described herein relate to a first switch, wherein: the second collective operation is executed concurrently with the first collective operation, and the second local node is configured to receive a final result of the second collective operation from the source node of the fourth switch.

In some aspects, the techniques described herein relate to a method including: communicating, via a source node, configuration information to a group of collective engines, the group of collective engines being configured as a distributed collective engine of a first collective operation, the configuration information indicating the source node is a master node of the first collective operation and that a local node of the first switch and a remote node of a second switch are subordinate to the source node in the first collective operation; distributing, via the source node, a collective command to the group of collective engines; and receiving, via a master collective engine, the configuration information from the source node; and exchanging, via the master collective engine, one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

In some aspects, the techniques described herein relate to a method, wherein: communication between the second collective engine and the master collective engine includes one hop based on the second switch being connected to the first switch, and communication between the third collective engine and the master collective engine includes two hops based on the third switch connecting to the first switch via the second switch.

In some aspects, the techniques described herein relate to a non-transitory computer-readable medium storing code that includes instructions executable by a processor to: communicate, via a source node, configuration information to a group of collective engines, the group of collective engines being configured as a distributed collective engine of a first collective operation, the configuration information indicating the source node is a master node of the first collective operation and that a local node of the first switch and a remote node of a second switch are subordinate to the source node in the first collective operation; distribute, via the source node, a collective command to the group of collective engines; and receive, via a master collective engine, the configuration information from the source node; and exchange, via the master collective engine, one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

In some aspects, the techniques described herein relate to a non-transitory computer-readable medium, wherein: communication between the second collective engine and the master collective engine includes one hop based on the second switch being connected to the first switch, and communication between the third collective engine and the master collective engine includes two hops based on the third switch connecting to the first switch via the second switch.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The techniques of in-switch collective primitive processing described herein include multiple advantages and benefits. For example, the described techniques regulate data traffic in a given network (e.g., HPC network), which decreases latency and minimizes performance bottlenecks. Also, the systems and methods described minimize the bottleneck issues associated with collective operations (e.g., all-reduce operations, barrier operations, etc.). For example, the systems and methods reduce congestion at a single point due to the distributed nature of the collective engines. The systems and methods reduce the time to transmit collective operations, for participants to respond with their contribution to the results and the master engine to distribute the final result.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
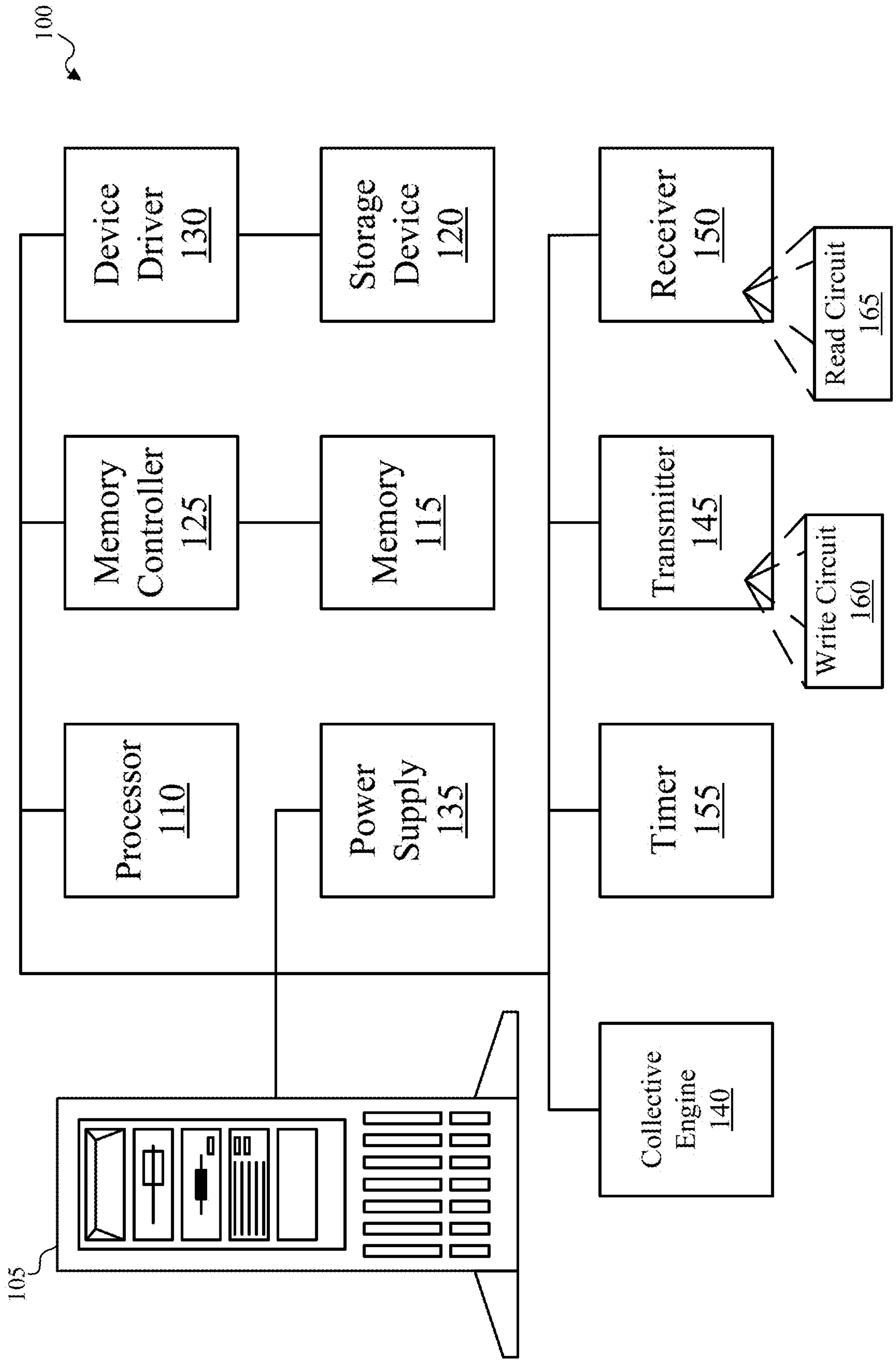
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

High performance computing (HPC). is the practice of combining computing resources to achieve better performance than a single computer, server, or workstation. HPC can be implemented as supercomputers or clusters of individual computers. HPC is used to solve large problems in business, engineering, and science by processing data and performing calculations at a faster rate than personal computers. For example, a laptop or desktop with a 3 GHz processor can perform around 3 billion calculations per second, while HPC can perform quadrillions of calculations per second. HPC can use the latest central processing units (CPUs), graphics processing units (GPUs), high-bandwidth memory (HBM), computational storage, near-memory processing (NMP), clusters of systems on chip (SoCs), and low-latency networking fabrics to perform large calculations in a fraction of the time it would take single computers. HPC can use GPU-accelerated systems for computationally intensive simulations that use large amounts of data and parallel computing.

HPC networking is a network infrastructure that supports low latency, high bandwidth, and multiple concurrent connections (e.g., between computing resources of a given HPC system). HPC networking is based on data networks between components of a cluster of HPC compute resources. HPC networking can use hundreds or thousands of compute servers that are networked to form a cluster. Algorithms and software programs run concurrently on the servers in the cluster. HPC clusters include groups of multiple servers that process complex calculations simultaneously in parallel. Each component computer in an HPC cluster may be referred to as a node. An HPC cluster can be networked with data storage. The HPC modules can be configured to work together to complete different tasks. HPC technologies can use a collapsed network backbone to make clusters and grids easier to troubleshoot. HPC systems can use an Ethernet fabric called based on network interface cards and switches with sophisticated congestion control to ensure consistent bandwidth and latency between resources.

The HPC networking systems and methods described herein may be based on Ethernet networking architectures. In some examples, HPC systems (e.g., HPC networking) may include non-volatile memory express (NVMe). NVMe is a data transfer protocol for SSDs and flash storage. NVMe was created to improve speed and performance of computer systems. NVMe is designed to use the PCI Express (PCIe) bus to connect SSD storage to servers and/or processors (e.g., central processing units).

In some examples, one or more aspects of HPC systems (e.g., HPC networking) may be based on peripheral component interconnect express (PCIe). PCIe is a high-speed interface standard that allows for the connection of various internal components in a computer system. PCIe is commonly found in desktop and mobile computers, server systems, set-top boxes, and gaming consoles. PCIe is used for connecting expansion cards (graphics cards, network cards, storage controllers) to a motherboard. In its simplest form, PCIe is a point-to-point connection between two PCIe compatible devices (e.g., between a motherboard and an expansion card or storage device, etc.). PCIe may be used to connect high-speed input output (HSIO) components such as graphics cards, SSDs, capture cards, wireless cards, redundant array of independent disks (RAID) cards, WiFi cards, etc. Compute express link (CXL) is an open standard for high-speed communication between a central processing unit (CPU) and other devices. CXL is built on the PCIe physical and electrical interface.

In some examples, one or more aspects of HPC systems (e.g., HPC networking) may be based on InfiniBand, Omni-Path, Slingshot, and/or Ultra Ethernet. InfiniBand can include a channel-based fabric that facilitates high-speed communications between interconnected nodes. An InfiniBand network may be made up of processor nodes, such as PCs, servers, storage appliances and peripheral devices. InfiniBand networks can include network switches, routers, cables, connectors, etc. Omni-Path may be based on Omni-Path Architecture (OPA), which may include a high-performance communication architecture. Slingshot may be based on Slingshot Interconnect, which may include a high-performance network for HPC supercomputers and HPC clusters. Ultra Ethernet may include an Ethernet-based communication stack architecture for high-performance networking. Thus, networking architectures described herein may be based on at least one of NVME, PCIe, InfiniBand, Omni-Path, Slingshot, and/or Ultra Ethernet.

Message passing interface (MPI) is a communication protocol for concurrency where modules interact by sending messages to each other through a communication channel. MPI includes two types of communication: point-to-point communication and collective communication. In point-to-point communication, messages are sent between two processes. Collective communication includes communication that involves a group of processes. Examples of collective communication include: broadcast of a single data item from one process to all other processes; broadcast of unique items from one process to all other processes; gathering data from a group of processes, etc. Some collective functions of MPI include MPI_Allreduce, MPI_Scatter, MPI_Gather, and MPI_Allgather. In MPI context, a communicator is a special object representing a group of processes that participate in communication. When a MPI routine is called, the communication will involve some or all of the processes in a communicator. An intra-communicator refers to a single group. The group of an intra-communicator is simply the set of all processes which share that communicator.

MPI can include message-passing application programming interface (APIs), together with protocol and semantic specifications for how MPI features behave in any implementation. MPI provides high performance, scalability, and portability. Message Passing Interface includes methods of inter-process communication and APIs for message queues. MPI provides a standardized way to exchange messages between multiple computers that are running a parallel program. MPI includes a library of functions that programmers can use to write parallel programs. MPI is a protocol used in HPC. For example, MPI can include a model of parallel computing where each parallel process has its own local memory. With MPI, data can be explicitly shared by passing messages between processes. MPI gives users the flexibility of calling a set of routines from common programming languages.

The MPI_Barrier function creates a barrier synchronization in a group. The barrier function forms a barrier where no processes in the communicator can pass the barrier until all of them call the function. If the communicator is an intra-communicator, the MPI_Barrier function blocks the caller until all group members have called it. The barrier function does not return on any process until all group processes have called the function. For example, process zero (P0) first calls MPI_Barrier at time T1. While process zero is hung up at the barrier, process one (P1) and process three (P3) eventually make it to the barrier at T2. When process two (P2) finally makes it to the barrier at T3, all of the processes are then allowed to begin execution again at T4.

The MPI all-reduce function is a collective communication operation that combines values from all processes in a communicator and distributes the result back to all processes. The MPI all-reduce function is a combination of MPI_Reduce and MPI_Broadcast. The MPI all-reduce function is a collective operation, which means that it must be called by all processes in the communicator. The function will return when all processes have completed the operation.

A virtual local area network (VLAN) is a virtualized connection that combines multiple devices and network nodes from different LANs into one logical network. VLANs allow network administrators to divide a physical network into separate logical broadcast domains. A LAN is a group of devices in the same place that share the same physical network. VLANs isolate the traffic for each group. A virtual private network (VPN) is a service that encrypts a device's connection to the Internet. VPNs create a secure tunnel that encrypt data and mask a user's IP address. Virtual system extension (VSX) is a security and VPN solution for large-scale environments based on the security of Check Point Security Gateway. VSX provides comprehensive protection for multiple networks or VLANs within complex infrastructures.

Serial peripheral interface (SPI) is a communication interface that allows for the fast, short-distance, high-speed transfer of synchronous data between embedded systems. SPI is a standard for synchronous serial communication and is used in embedded systems. SPI uses a master and subordinate configuration, where the master has control over the subordinates. The subordinates receive instructions from the master.

High bandwidth memory (HBM) is a type of computer memory technology that integrates system memory into the processor package. HBM is designed to provide low power consumption and high-bandwidth. HBM may use a 3D stacking technology that connects vertically stacked memory chips with microscopic wires called through-silicon vias (TSVs). An HBM stack can contain up to eight DRAM modules, which are connected by two channels per module. HBM offers a higher memory rate than DDR5 memory, making it ideal for applications for extreme data bandwidth. HBM may be used in high-performance computing applications, such as network devices, high-performance datacenters, AI ASICs, and high-performance graphics accelerators.

Computational storage is a storage device architecture that allows data to be processed at the storage device level. Computational storage adds compute resources (e.g., processing units) to storage devices. Computational storage is also known as in-situ processing or in-storage compute. Computational storage devices have processors that can execute specific computational functions directly within the storage hardware. This allows for the ability to perform selected computing tasks within or adjacent to a storage device, rather than the central processor of a server or computer. Thus, computational storage reduces the amount of data that needs to move between the storage plane and the compute plane. Computational storage adds compute to storage in ways that drive efficiencies and enable enhanced complementary functions. Computational storage architectures improve application performance and infrastructure efficiency.

Near-memory processing (NMP) is a paradigm that allows memory-centric computing. It involves moving compute capability next to the main memory (DRAM modules). This can help address the CPU-memory bandwidth bottleneck and improve the performance of memory-constrained workloads. In some cases, NMP may include cache memory in a CPU chip or to memory inside a CPU package.

A system-on-chip (SoC) is a microchip that contains all the electronic circuits and parts for a given system. An SoC is a type of integrated circuit (IC) design that combines many or all high-level function elements of an electronic device onto a single chip. This differs from traditional electronics design, which uses separate components mounted to a motherboard. SoCs typically contain a processor, memory, input/output interfaces, etc. SoCs may include analog, digital, mixed signal and other radio frequency functions all lying on a single chip substrate. SoCs are used in electronics industry due to low power consumption. SoCs are used in for mobile phones, routers, digital cameras, etc.

Solid-state drives (SSDs) are storage devices used in computers that stores data on solid-state flash memory (e.g., NAND flash memory). NAND flash is a non-volatile storage technology that stores data without requiring power. NAND flash may be referred to as a memory chip. Flash memory cards and SSDs use multiple NAND flash memory chips to store data. In data management, "hot" data is data that is frequently accessed or in high demand. Hot data is regularly in demand and in transit, and is not stored for long periods of time. Thus, data hotness is the relative degree of how often data is accessed or requested. SSDs work with a computer's memory (random-access memory (RAM)) and processor to access and use data. This includes files like operating systems, programs, documents, games, images, media, etc. SSDs are permanent or non-volatile storage devices, meaning SSDs maintain stored data even when power to the computer is off. SSDs may be used as secondary storage in a computer's storage hierarchy.

In some examples, HPC systems (e.g., HPC networking) may include non-volatile memory express (NVMe). NVMe is a data transfer protocol for SSDs and flash storage. NVMe was created to improve speed and performance of computer systems. NVMe is designed to use the PCI Express (PCIe) bus to connect SSD storage to servers and/or processors (e.g., central processing units).

In some examples, HPC systems (e.g., HPC networking) may include peripheral component interconnect express (PCIe). PCIe is a high-speed interface standard that allows for the connection of various internal components in a computer system. PCIe is commonly found in desktop and mobile computers, server systems, set-top boxes, and gaming consoles. PCIe is used for connecting expansion cards (graphics cards, network cards, storage controllers) to a motherboard. In its simplest form, PCIe is a point-to-point connection between two PCIe compatible devices (e.g., between a motherboard and an expansion card or storage device, etc.). PCIe may be used to connect high-speed input output (HSIO) components such as graphics cards, SSDs, capture cards, wireless cards, redundant array of independent disks (RAID) cards, WiFi cards, etc. Compute express link (CXL) is an open standard for high-speed communication between a central processing unit (CPU) and other devices. CXL is built on the PCIe physical and electrical interface.

In PCIe, a transaction layer packet (TLP) is a packet that relates to PCIe's highest layer. TLPs are the fundamental units of data transfer in PCIe. TLPs include a header and a data payload. The header contains information about the type of transaction, the device and function number, and other control information. The data payload contains the actual data being transferred. The smallest PCIe Transaction Layer Packet (TLP) can be considered as being 3 double words (DWORDs; e.g., 12 bytes) plus the 4-byte link cyclic redundancy code (LCRC) for a total of 16 bytes (128 bits). DWORDs are a 32-bit unsigned integer that can store memory addresses, file sizes, and other numerical data. DWORDs may be used in computer programming and operating systems.

Multicast is a computer networking method that allows a single source to communicate with multiple receivers simultaneously. It can be a one-to-many or many-to-many distribution. With multicast, a source sends a single copy of data to a single multicast address. The multicast server sends out a single stream during transmission. The broadcast packets are forwarded from the multicast server source to a client subnet where multiple client devices are listening for packets. Multicast can use user datagram protocol (UDP) to broadcast a stream over a closed internet protocol (IP) network like a local area network (LAN) or an IP service provider's network. Multicast IP routing protocols are used to distribute data to multiple recipients, such as audio/video streaming broadcasts. Multicast may be used in distributed multimedia applications. For example, multiparty audio/video conferencing is a widely used services in Internet telephony.

A packet engine, or packet processing engine (PPE), is a system that includes software and/or hardware resources. The packet processing logic of a packet engine includes hardware and/or software mechanisms that take action based on the results of evaluating different fields of incoming packets. Packet processing finds the highest-priority match. Packet processing generally integrates network protocol interfaces, crypto-engines, pattern matching engines, and/or hardware queues for quality of service (QoS). A packet engine may include a packet analyzer, or packet sniffer, that is configured to intercept and monitor packets as they traverse a network. A packet engine may include a network analyzer, protocol analyzer, and/or packet capture appliance. A packet engine may include a fast-forwarding engine (FFE), a packet processing architecture that helps optimize the packet-routing process. FFE classifies packets into packet flows based on the IP protocol, source and destination IP address, and protocol-specific information.

The data plane (e.g., forwarding plane, user plane, carrier plane, data path, or bearer plane) is a high-speed path through a router or switch. Packets that pass through a device use the data plane, as opposed to packets directed to the device. For this reason, the data plane is also called the forwarding plane. Data Plane traffic is forwarded through a device. The data plane, the control plane, and the management plane are three components of a networking architecture. The control plane is the set of protocols that help to configure, direct, or control the data plane. A data plane port is a high-speed path through a router or switch that carries user traffic (e.g., data plane traffic). The control plane may be responsible for managing and controlling the network, while the data plane may be responsible for transmitting and receiving data packets. The management plane may be responsible for configuring and monitoring network devices, up to and including all layers of the network stack.

High-performance computing (HPC) applications may rely on collective communication for operations that use data exchanges or synchronization across multiple processes. The message passing interface (MPI) standard defines and specifies various functions for collective operations that involve communication within a group or groups of processes. Support for MPI collectives can be provided at the hardware, middleware or software stack level. However, software implementations can breakdown collective-based communication into a set of point-to-point messages, which leads to additional traffic in the network, increased latency, and a performance bottleneck due to limited scaling, which results in increased communication latency and decreased system efficiency. Also, software implementations can have longer processing times when doing collective operations than hardware-based implementations The techniques described herein provide an in-switch hardware unit (e.g., collective processing unit) that can be targeted by the compute nodes as an endpoint. In some cases, the in-switch hardware unit may be configured to facilitate collective communication. In some examples, the in-switch hardware unit may be configured to provide scaling to multiple endpoints (e.g., thousands of endpoints) across a given cluster.

Based on the described techniques, the in-switch hardware unit is configured to overcome the limitations of other systems. For example, the in-switch hardware unit may be configured to prevent the breakdown of collective-based communication into a set of point-to-point messages. Accordingly, the in-switch hardware unit regulates traffic in a given network, decreases operational latency (e.g. at full system scale), reduces packets on inner-switch links, reducing bottlenecks, decreases latency due to parallelism, provides scalability due to distributed resources, and minimizes performance bottlenecks based on the scaling the in-switch hardware unit provides to multiple endpoints across a cluster.

The techniques described herein include a packet engine (e.g., hardware packet engine). The packet engine may include an architecture that enables the packet engine to serve as a network endpoint within a switch to offload and accelerate communication. In some examples, the packet engine may be configured to facilitate collective processing, multicast processing, congestion metrics collection, and/or dissemination, etc. In one or more examples, the packet engine may be multiply-instantiated (e.g., multiple instances within a switch and across multiple switches in the system). In some cases, the packet engine may be attached to existing data plane ports of a switch in which the packet engine is embedded. Multiple packet engines working in concert may act as a single larger packet engine to support relatively large collectives.

The described systems and methods may include a packet engine configured to provide in-switch collective primitive processing. In some examples, the packet engine may include one or more functional blocks (e.g., one or more custom functional blocks). The functional blocks may include any combination of hardware (e.g., at least one memory, cache, and/or flash memory; at least one processor, FPGA, ASIC, and/or microcontroller, etc.), logical circuitry, firmware, and/or software to provide in-switch collective primitive processing. The functional blocks may be referred to as logic or logical circuits (e.g., data path interposer logical circuit, input logical circuit, output logical circuit, etc.). The one or more functional blocks may include a data path interposer configured to extract and/or inject traffic into data path between a port and virtual link (VL) queue. The data path interposer may be configured to modify flow control status to support data flow changes by an associated packet engine. The one or more functional blocks may include an input (e.g., input functional block, input checker and steering) configured to perform protocol validation checks and/or address-based steering to an appropriate processing block (e.g., to a processing block indicated by an instruction). The one or more functional blocks may include an output (e.g., output functional block, output queuing) configured to queue output packets from other blocks until the output packets are injected into a given data path. In some cases, the output may be configured to perform route table lookup on packet.

In some cases, a packet engine may include a collective processing unit. In implementations, the collective processing unit may be configured to provide support for multiple simultaneous collective contexts (e.g., multiple simultaneous collective contexts in operation, multiple simultaneous collective jobs, multiple active simultaneous collective contexts). In some examples, the collective processing unit may facilitate tracking and completion of collective-based communication across the network. The described techniques include a packet engine architecture configured to extract and/or inject packets from native data plane ports. In some examples, a switch may be configured with multiple processing units. Based on the described techniques, a switch (e.g., each switch in a given system) may include a collective processing unit. In some cases, the collective processing unit may be configured to support a relatively large number of independent collective contexts within or across jobs (e.g., within or across collective processing jobs, multicast requests, etc.). The described techniques provide hierarchical processing of collectives by defining master and/or subordinate switches as collective participants. For example, a master switch may be configured to control one or more subordinate switches. In some examples, the master switch may include a first collective processing unit, a first subordinate switch may include a second collective processing unit subordinate to the first collective processing unit, a second subordinate switch may include a third collective processing unit subordinate to the first collective processing unit, and so on.

It is noted that a device id (or full address) does have to relate to a single bit (e.g., of a participant bit vector (PBV) table). In some cases, sending a device ID or address in a packet could be done instead. Mapping a single bit to a device IDs in a PBV table may be done for efficiency. Instead of sending 16 bits (device ID) or 32/64 bits (full address) to represent a device, sending a single bit can dramatically reduce the data sent across a fabric to represent the devices including in a collective group. In some cases, a collective engine may configure collective groups based on single bits of data in the PBV table, and only looking up the full device ID or address as needed.

It is noted that there can be multiple ways to transfer initialization data and/or other data. The mechanism described herein may group like types of data when sending from a master switch to collective engines of the collective group. In some cases, data may be grouped into multiple packets where each packet is a record describing the information related to a single device. Sending records may be done to provide increased flexibility, removing limitations imposed by defined frame formats such as parsing/processing of collectives. In some cases, configuration may be communicated out-of-band. In some cases, configuration information may be communicated/processed based at least on firmware in a given switch, while run-time operations may be processed at least by hardware in the given switch.

It is noted that the hierarchy of collective engines may be configured for downstream propagation. The collective engines can be configured with the downstream (e.g., lower in the hierarchy) distribution pattern for any packets a collective engine propagates. This information may be indicated by a bit in a given PBV table. The bit may be set for switches (e.g., a collective engine in each switch) and clear for end devices. In some cases, two sets of bits associated with each collective may be implemented (e.g., one bit for participant end devices and one bit for participant switches). When receiving configuration packets from upstream, some packet types may only be distributed to participating switches. When receiving other packet types, those packets may be sent to participating switches and locally tracked participant end devices.

It is noted that to support responses upstream, request packets may include modification of the requestor ID in said request packets at every hop to facilitate responses. When a master collective node (e.g., source node) sends a packet to a master collective engine, the first packet may include the ID of the master collective node. The receiving collective engine may store the ID of the master collective node, associating it with that collective group (e.g., CC_ID). When a collective engine forwards a received packet, the collective engine may replace the requestor ID (e.g., of the master collective node) with its own ID in the forwarded packet. In some cases, the destination address may be update to the collective engine or end device that a packet is directed to. The collective engine may track PBVs corresponding to all the devices that a packet was forwarded to for a given CC_ID. When an end device receives the collective packet, the end device may store the requestor ID. Processing at the end devices may occur based on the collective packets. When an end device finishes processing the collective packet, assuming the end device is to respond (based on non-posted packets), the end device may use the stored requestor ID to generate the address for the response packet. With posted packets, no response may be generated or expected (e.g., fire-and-forget packets). With non-posted packets, a response or completion message (e.g., barrier met message) may be sent in the reverse direction from the receiver to the sender to indicate the packet is received or a task completed or barrier met. The response packet may be sent upstream to the requesting collective engine. When a collective engine gets responses from all participating downstream devices, the collective engine may perform any configured processing on data, and may generate a partial response (e.g., a completion response of one subordinate collective engine in the collective group). The collective engine may send the response upstream to a next level of switch hierarchy. When the collective engine at the top of the hierarchy receives all expected responses, this collective engine may perform a final processing based on configuration, generating a final response (e.g., a completion response of the master collective engine in the collective group). The master collective engine may then distribute the response to all participants (e.g., based on the configuration of the collective packet received by the master collective engine).

It is noted that the systems and methods may include error handling. The systems and methods may include retry message and/or failure message types. Some multicast implementations may be posted multicast, where multicast messages are on a best effort basis with higher layers of the protocol being used to check for non-delivery (e.g., not an issue as far as the switch/packet engine are concerned). For collectives (e.g., and non-posted multicast), watchdog timeouts, retries and/or status data allowing the recovery process visibility into the actual failure point (e.g., a collective engine and/or one or more end devices) may be implemented. Error recovery may be performed, based on receipt (or lack) of response packets to protect against improper behavior and/or results. The system and methods may avoid software processing times and/or or worse check pointing.

A single collective engine may transmit and receive packets (e.g., all packets) at a single point. In some examples, the all-reduce command may be relatively short (e.g., 32 bytes), where 32 bytes may take around 2 ns/packet to transmit, or 2 μs if transmitted sequentially to 1000 participants from one engine, or around 120 ns if transmitted somewhat in parallel with distributed engines. When responding with 1 k byte payloads, each packet may take approximately 66 ns at PCIe gen 6 speeds. Accordingly, if a single engine sequentially receives packets from 1000 participants in a collective, it may take 66 μs for the single engine to receive all the packets and based on an all-reduce operation, another 66 μs to distribute the result to every participant. This may result in less than 10,000 collectives of this type per second, not including congestion/processing time/etc.

The systems and methods described may include a configuration with one master engine and 31 slave engines, supporting 1000 participants. Accordingly, the time for participants to receive a packet may be around 4 microseconds due to the relatively large parallelism of the distribution, where 4.16 μs=(66 ns*31 switches)+(66 ns*32 participants/switch). The systems and methods not only provide a significant reduction in time to transmit packets, but the significantly reduced traffic cuts congestion on the inter-switch links.

Based on a single collective entity (hardware or software), a single instance may be provisioned to support all participants and do all the manipulations for a given collective group. Since each engine can act as a proxy for multiple downstream devices (e.g., directly connected of multiple layers of hierarchy), each engine may track a small number of participants on the order of less than a hundred, while the total number of participants supported in the collective may be in the multiples of thousands. Given the building block of the collective engine, significant resources are not wasted when the systems and methods are implemented in relatively small systems, while the systems and methods include the flexibility to support relatively large systems. It is noted that multiple messages may be communicated during a collective operation. The collective messages may be referred to and/or include configuration packets, initialization packets, collective packets, collective frames, collective commands, command frames, and the like. In some cases, a collective message may include configuration information, initialization information, a portion of a task of a collective operation, a status of a portion of a task, a barrier met message, a barrier satisfied message, etc. For example, a first device (e.g., switch, collective engine, node) may receive a first collective frame with a first portion of a collective operation, a second device (e.g., switch, collective engine, node) may receive a second collective frame with a second portion of the collective operation, and so on. The first device may communicate a first response (e.g., another collective frame) indicating a result of the first portion of the collective, the second device may communicate a second response (e.g., another collective frame) indicating a result of the second portion of the collective, and so on.

Table 1 highlights the performance differences between monolithic collective engines and distributed collective engines.

TABLE 1

| Flattened Butterfly topology of 32 switches with 32 endpoints per switch (2x lanes of PCIe Gen 6 per port) | | |
|---|---|---|
| | Monolithic Collective Engine | Distributed Collective Engines |
| Master engine(s) | 1 | 1 |
| Subservient Engine(s)s | 0 | 31 |
| Participating Endpoints | 1024 | 1024 |
| Frames sent/received from master collective engine per communication operation | 1023 to/from endpoints (+1 to source node for responses) | 31 to/from subservient engines & 31 local endpoints (+1 to source node for responses) |
| Frames sent/received per subservient collective engine per communication operation | n/a | 32 to/from locally attached end nodes (+1 to master engine for responses) |
| Frames sent per ISL from master collective engine's switch | 32 | 1 |
| Time required to forward 32 byte collective command to all endpoints | ~2 μs | ~126 ns |
| Time required to receive 1k byte payload (1056 bytes) collective responses from all endpoints | ~67.5 μs | ~4.16 μs |

It is noted that times listed in Table 1 may be based on without consideration towards congestion and/or latency through switches (e.g., just time to transmit frames).

The systems and methods described herein may include a first switch that includes a master collective engine that may be connected to one or more other switches. For example, the first switch and/or master collective engine may be connected to at least a second switch that includes a subservient collective engine. In some cases, a collective operation may involve multiple switches (e.g., the first switch, the second switch, etc.). In some cases, a switch (e.g., each switch) may include a collective engine. The systems and methods may include multiple collective engines (e.g., the master collective engine of the first switch, the subservient collective engine of the second switch, etc.), where the multiple collective engines may be configured to exchange collective frames to function as a single, distributed collective engine. In some cases, at least one switch (e.g., each switch) may be locally attached to one or more end node participants in the collective.

In some examples, at least one switch associated with a collective operation may be directly connected to the first switch and/or at least one switch of the collective operation may be indirectly connected to the first switch (e.gt. based on network fabric topology). In some cases, one or more collective engines (e.g., of the multiple collective engines)

may communicate directly with the master collective engine and/or one or more collective engines may communicate via one or more layers of hierarchically arranged collective engines between the lowest layer engine and the master collective engine.

In some examples, a node of a switch may be configured as a collective master (e.g., master node, source node) that configures the distributed collective engine by providing configuration information to the collective engine in each switch participating in the collective. In some examples, the master collective engine may be in the same switch as the node configured as the collective master. In some cases, a node of a switch configured as the collective master may issue a collective command to the master collective engine and the master collective engine may replicate the collective command and distribute it to subservient collective engines (e.g., collective engines of the distributed collective engine).

In some cases, the collective engines of the distributed collective engine may replicate and distribute the collective command to locally attached end nodes which are participants in the collective. For example, a collective engine of a second switch may receive the collective command from the master collective engine, and the collective engine of the second switch may replicate and distribute the collective command to one or more nodes of the second switch. In some cases, the collective engine of the second switch may replicate and distribute the collective command to one or more collective engines subservient to the second switch. For example, the collective engine of the second switch may replicate and distribute the collective command to a third switch, where the third switch communicates with the first switch and/or master collective engine via the second switch. Accordingly, a collective engine of the third switch may receive the collective command from the collective engine of the second switch, and the collective engine of the third switch may replicate and distribute the collective command to one or more nodes of the third switch.

In some examples, the nodes of the switches of the distributed collective engine may perform one or more tasks of the collective operation and provide results of processing the one or more tasks to the master collective engine. In some cases, a node of a switch (e.g., each node of each switch participating in the collective operation) may generate a response to the collective command via frames destined to the collective engine residing in respective locally attached switch. For example, a first node of the second switch may provide a response to the collective engine of the second switch, a second node of the second switch may provide a response to the collective engine of the second switch, a first node of the third switch may provide a response to the collective engine of the third switch, and so on.

In some cases, the response from a subservient collective engine may be communicated directly to the master collective engine or may be communicated via one or more layers of hierarchically arranged collective engines. In some examples, a collective engine of a switch (e.g., each subservient collective engines) may process responses received from locally attached node participants and may create a single partial response based on the responses received. Thus, in some cases, a collective engine may serve as a proxy for locally attached participant nodes, sending an aggregated response to the master collective engine that represents the responses from the locally attached end nodes of that collective engine. For example, the second switch may send a first aggregated response to the master collective engine that represents the responses of each node of the second switch that is participating in the collective operation. In some cases, a response from a node (e.g., each response from each node) may include a partial result of the collective operation. For example, the collective operation may include multiple tasks that are distributed among the collective engines of the collective operation (e.g., the distributed collective engine).

Based on the third switch communicating with the first switch via the second switch, the third switch may provide a second aggregated response to the collective engine of the second switch that represents the responses of each node of the third switch that is participating in the collective operation. Thus, the first aggregated response may include the responses of each node of the second switch participating in the collective operation and the response of each node of the third switch participating in the collective operation, etc. In some cases, the second switch may forward the second aggregated response of the third switch to the master collective engine, where the master collective engine receives the first aggregated response and the second aggregated response as separate responses.

In some examples, the master collective engine may receive a set of one or more responses from subservient collective engines representing all non-locally attached end nodes and/or may receive individual responses from end node participants locally attached at the first switch. Based on receiving the partial, proxy responses as well as local individual responses representing all end node participants in the collective, the master collective engine may process the partial results (e.g., partial results of each participating node) to determine a final result. In some cases, the master collective engine may distribute the final result to one or more subservient collective engines (e.g., each subservient collective engine of the distributed collective engine).

The systems and methods provide hierarchical distributed mechanisms for location and ownership of collective contexts with the benefits of network traffic reduction. The systems and methods provide increased scaling of collective capacity in the network based on the distributed mechanisms allowing physical costs to be amortized over components across the entire network. In some cases, one or more collective engines may be configured as addressable endpoints, providing a flexible hierarchy. For example, the hierarchical distributed mechanism described herein may be enabled by addressable endpoints, where the addressable endpoints enable location information and/or ownership of collective contexts, resulting in reduced network traffic, economic scaling of collectives, collective capacity, flexible hierarchy etc.

In some examples, an addressable endpoint enables location of context ownership anywhere in a given network. Because a collective engine is addressable, a master node of a given collective may assign a collective engine in the system (e.g., any collective engine in the system) as the master engine for that collective. Accordingly, based on addressable endpoints, the master node may use the address of a desired collective engine to steer collective frames to that engine (e.g., to that collective engine, to the packet engine of that collective engine, etc.). It is noted that a master engine may include a master collective engine and/or a master packet engine. In some cases, a packet engine may also be considered a master engine when a collective engine of that packet engine is assigned as a master engine of a collective. Additionally, or alternatively, a collective engine may also be considered a master engine when a packet engine that includes the collective engine is assigned as a master engine of a collective. In some cases, a switch that includes the master packet engine and/or master collective engine may be considered a master switch. In some cases, a master switch and/or master engine may be selected by a source node.

In some cases, making collective engines addressable may include providing an API to the software stack and giving software the ability to tune, optimize, and/or load balance one or more collective contexts in a given workload. Making collective engines addressable may include partitioning collective hardware resources across multiple simultaneous workloads running in a given system. In some cases, a core designated as a master node may use memory mapped IO commands to an addressable endpoint to configure a collective context in the network based on taking into account a global view of the system. A collective context may be defined by assigning a master engine on a switch as the owner of the collective context. The master engine may determine and/or may be provided a list of participating endpoints in that collective operation as part of the configuration.

In some examples, the addressable endpoint optimizes performance for various traffic patterns (e.g., minimize time required to forward 32-byte collective command to all endpoints; minimize time required to receive 1 k byte payload (1056 bytes) collective responses from all endpoints; etc.). In some cases, the addressable endpoint enables parallelism that improves the performance of various traffic patterns (e.g., based on assigning any context engine as a master for a given context of a given collective). In some examples, making collective engines addressable enables two or more collective engines to be masters of respective contexts of a given collective. For example, a collective engine may be configured as a master packet engine of a given collective (e.g., collective operation). In some cases, based on addressable endpoints, a first collective engine may be configured as a first master collective engine of a first context of that collective, and a second collective engine may be configured as a second master collective engine of a second context of that collective. When only one collective engine is master (e.g., for 10× simultaneous contexts), processing is serialized though the one master engine. When two collective engines (e.g., two or more collective engines) can be master (e.g., for two sets of 5× simultaneous contexts based on parallelism), processing time and/or frame streaming time is roughly halved.

Enabling one or more collective engines to be configured as addressable endpoints improves traffic pattern performance based on reducing congestion. A single master may have a relatively large amount of traffic converging on it, resulting in an increase in traffic congestion in addition to the serialized processing, all of which increases latency. When two collective engines can be masters, congestion is reduced, further improving processing time and/or frame streaming time. In some examples, the configuration information may be based on a configuration that is determined to optimize traffic patterns of a given network. In some cases, assigning a collective engine as a master of a given context provides the optimization and may be configured during configuration.

In some cases, collectives may be non-posted transactions for guaranteed delivery instead of just best effort. Some systems rely on end to end retries, causing a full restart of the collective context to accomplish this. However, the systems and methods described localize the retries to individual packets of the collective operation, providing significant performance benefits and increased system efficiency and uptime.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115.

Machine 105 may include power supply 135. Power supply 135 may provide power to machine 105 and its components. Machine 105 may include transmitter 145 and receiver 150. Transmitter 145 or receiver 150 may be respectively used to transmit or receive data (e.g., HPC packets, collective communications). In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155. Timer 155 may be used to track an age of a packet, to add a timestamp to a packet, to determine when a lifespan of a packet expires, track a lapsed time of a collective process, indicate a start time of a collective process, indicate an end time of a collective process, etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, collective engine 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of collective engine 140 may be implemented as an SoC.

In some examples, collective engine 140 may include any one or combination of logic (e.g., logical circuit), hardware (e.g., processing unit, memory, storage), software, firmware, and the like. In some cases, collective engine 140 may perform one or more functions in conjunction with processor 110. In some cases, at least a portion of collective engine 140 may be implemented in or by processor 110 and/or memory 115. The one or more logic circuits of collective engine 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable collective engine 140 to provide in-switch collective primitive processing.

In one or more examples, collective engine 140 may be configured to operate in conjunction with and/or incorporated in a packet engine, to facilitate collective processing, multicast processing, congestion metrics collection, and/or dissemination, etc. In implementations, collective engine 140 may be configured to provide support for multiple simultaneous collective contexts (e.g., multiple simultaneous collective contexts being initialized). In some examples, collective engine 140 may facilitate tracking and completion of collective-based communication across the network.

In some cases, collective engine 140 may be configured to support a relatively large number of independent collective contexts within or across jobs (e.g., within or across collective processing jobs, multicast requests, etc.). The described techniques provide hierarchical processing of collectives by defining master and/or subordinate switches as collective participants. For example, a master switch may be configured to control one or more subordinate switches. In some examples, the master switch may include a first collective engine, a first subordinate switch may include a second collective engine that is subordinate to the first collective engine, a second subordinate switch may include a third collective engine subordinate to the first collective engine, and so on.

Figure 2:
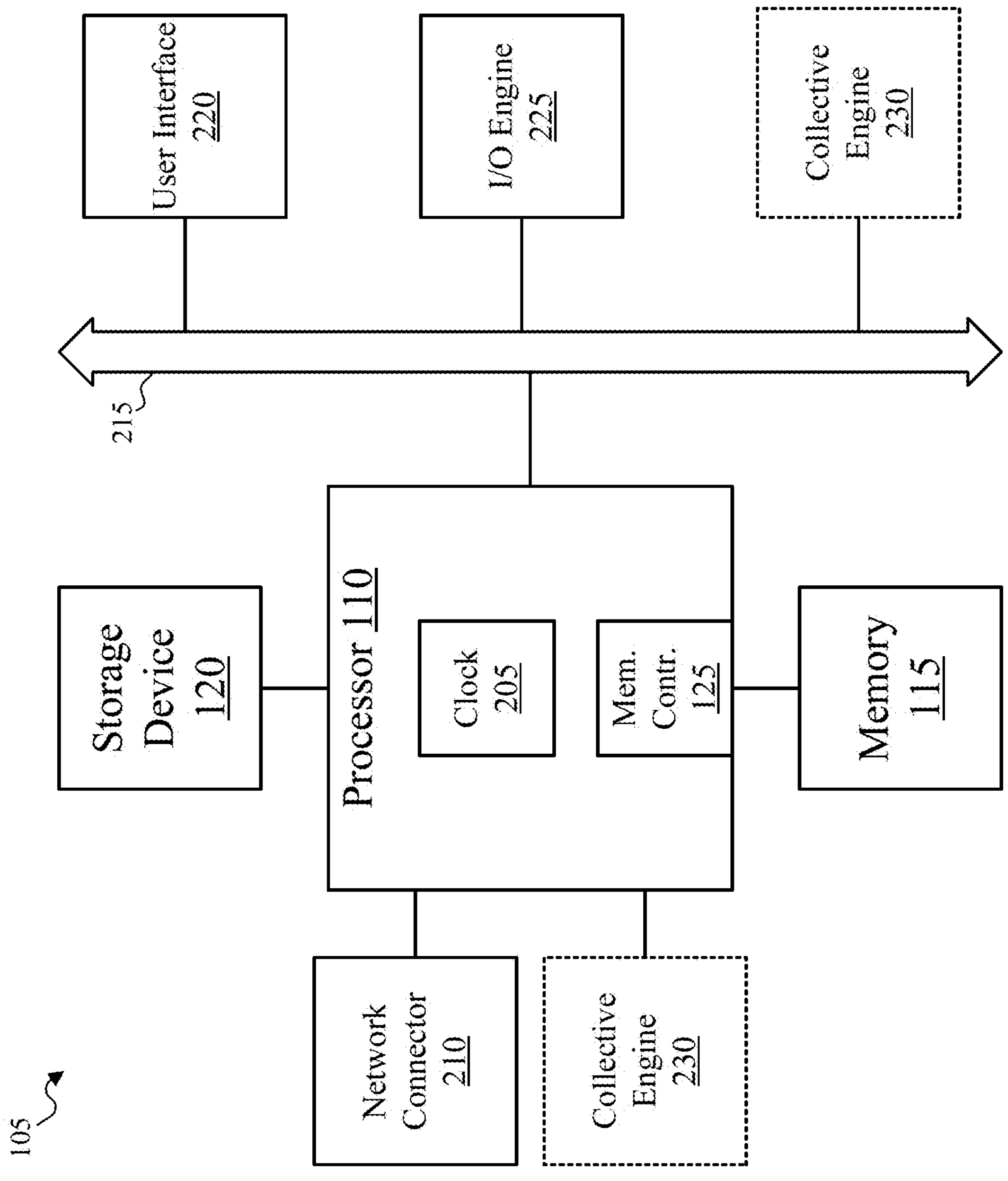
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to collective engine 230, which may be an example of collective engine 140 of FIG. 1. Additionally, or alternatively, processors 110 may be connected to buses 215, to which may be attached collective engine 230. Collective engine 230 may include logic to provide in-switch collective primitive processing. The logic may include any combination of hardware (e.g., at least one memory, at least one processor), logical circuitry, firmware, and/or software to provide in-switch collective primitive processing.

Figure 3:
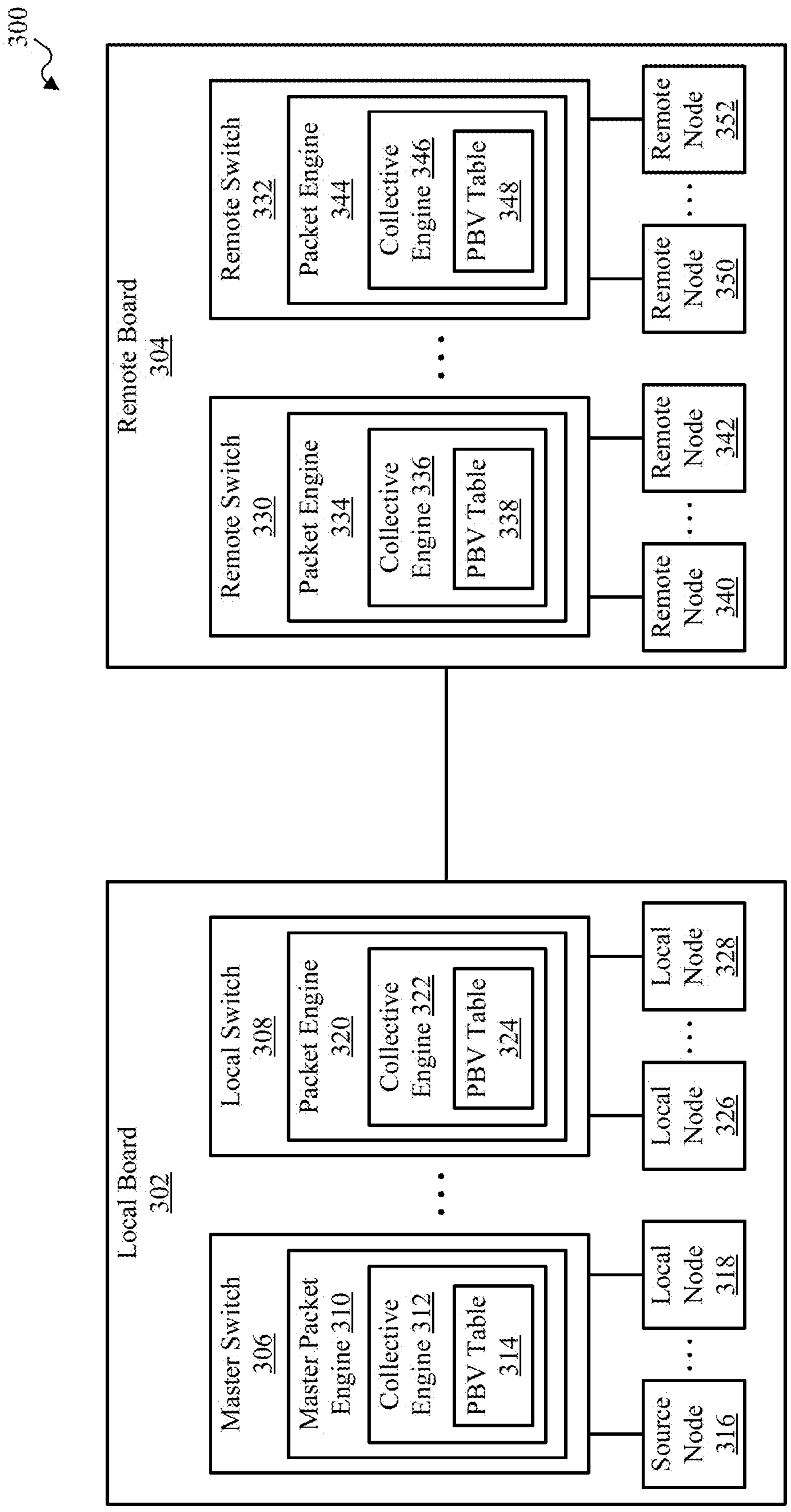
FIG. 3 illustrates an example system in accordance with one or more implementations as described herein.

FIG. 3 illustrates an example system 300 in accordance with one or more implementations as described herein. In some cases, system 300 may be an example of system 100. In the illustrated example, system 300 includes one or more boards (e.g., printed circuit boards), which may include local board 302 and remote board 304. In some cases, local board 302 may be part of a first rack of an HPC enclosure, and remote board 304 may be part of a second rack of the same HPC enclosure. In some cases, the HPC enclosure may be part of a cluster of HPC resources (e.g., HPC servers, HPC networks, HPC clusters, etc.).

As shown, local board 302 may include one or more switches, which may include master switch 305 and local switch 308. In the illustrated example, master switch 306 may include master packet engine 310, which may include collective engine 312 and participant bit vector (PBV) table 314. As shown, master switch 306 may include one or more nodes, which may include source node 316 (e.g., collective originator, collective master processor, collective master controller) and local node 318. In the illustrated example, local switch 308 may include packet engine 320, which may include collective engine 322 and PBV table 324. As shown, local switch 308 may include one or more nodes, which may include local node 326 and local node 328. The depicted nodes of system 300 may include any combination of hardware (e.g., at least one memory, at least one processor), logical circuitry, firmware, and/or software to provide in-switch collective primitive processing.

As shown, remote board 304 may include one or more switches, which may include remote switch 330 and remote switch 332. In the illustrated example, remote switch 330 may include packet engine 334, which may include collective engine 336 and PBV table 338. As shown, remote switch 330 may include one or more nodes, which may include remote node 340 and local node 342. In the illustrated example, remote switch 332 may include packet engine 344, which may include collective engine 346 and PBV table 348. As shown, remote switch 332 may include one or more nodes, which may include remote node 350 and remote node 352. It is noted that a collective engine of system 300 may be an example of collective engine 140 of FIG. 1 and/or of collective engine 230 of FIG. 2.

The systems and methods described herein may transmit packets addressed to collective engine 312 in master switch 306, which then distributes addressed packets to subordinate switches that send to collective participants. In some cases, local switch 308, remote switch 330, and/or remote switch 332 may be subordinate switches of master switch 306. In some cases, master switch 306 may track responses by responder, which is an improvement over counting responders as it enables master switch 306 to determine which participant(s) failed to respond, and thus provide improved diagnostics. In some cases, the systems and methods route collective traffic (e.g., packets, TLPs) using switch route tables and associated logic. It is noted that "packet" and "TLP" may be used interchangeably throughout the provided description. It is noted that "node" and "endpoint" may be used interchangeably throughout the provided description.

In one or more examples, a collective engine of system 300 (e.g., collective engine 312, collective engine 322, collective engine 336, and/or collective engine 346) may be configured to implement a barrier function and/or an all-reduce function. The barrier function may be an MPI function that synchronizes processes across members of a group (e.g., collective group). It is noted that one or more endpoints may hit the barrier asynchronously relative to other endpoints. The process may wait for all endpoints to hit the barrier before proceeding, thus synchronizing the processing steps across the collective participants. A barrier function may be used when all processes in a group are to finish a part of code before moving on to another part of code. For example, a barrier function may determine that all processors have finished processing a first part of code before allowing the processors to begin processing a second part of code. In some cases, a barrier function may block a caller until all group members have called the function. For example, the function does not return on any process until all group processes have called the function. The barrier function may be based on two or more groups. For example, the function may return on processes in a first group after all members of a second group have called the function, and vice versa. The function can return for a process before all processes in its own group have called the function.

In some cases, an all-reduce function, also known as all-reduce, may be a collective operation that combines data from different processing units into a single result and then distributes that result back to all the processing units. The operation can perform reductions on data, such as finding the minimum, maximum, sum, etc., across devices. The result may then be written into the receive buffers of every rank. All-reduce can be used for distributed deep learning, which can reduce training time. For example, in synchronized data-parallel distributed deep learning, all-reduce can be used to compute the mean of gradients between GPUs. In some cases, an accumulator (e.g., of a switch) may add operands from All-reduce packets to an accumulated value.

In some cases, a collective engine of system 300 may be configured to track participants and/or generate responses on collective satisfaction. In some cases, a collective engine of system 300 may be configured to provide hardware support for in-switch collective communication. In some cases, a collective engine of system 300 may use a PBV table (e.g., bitmap tracker) to track inputs from collective members based on clearing a bit map. For example, master switch 306 may track inputs from collective members based on clearing a bit map of PBV table 314.

In some examples, the systems and methods may include in-band signaling and/or out-of-band signaling. In-band signaling may include sending information (e.g., control information) using the same channel or band used to communicate data. Out-of-band signaling can include information sent over a channel or network different from the channel/network used to communicate data.

In one or more examples, a collective engine of system 300 may configure a context table, mapping device identifiers (IDs) to PBV bit-vector locations. Data packets may be sent via a packet engine (e.g., master packet engine 310). A collective engine (e.g., collective engine 312) may perform the mapping process in-band, by sending packets to a switch's packet engine (e.g., to packet engine 320 of local switch 308). Additionally, or alternatively, the collective engine may perform the mapping process out-of-band, by sending packets via an interface such as a serial peripheral interface (SPI).

Based on the described techniques, packets received by a collective engine may be pre-processed (e.g., by packet engine 320 of local switch 308 and/or by packet engine 334 of remote switch 330, etc.) to confirm that the packet is destined for the collective processing section and that packet-level validation has been performed.

Upon receipt of an initialize collective Type and/or Opcode field combination, a given collective engine (e.g., collective engine 322) may perform at least one of the following operations: (a) store the collective context information (e.g., device ID, tag, DMU_ID or endpoint identifier, PBV, participant count (p_count), accumulator value based on an all-reduce operation); (b) create a copy of the PBV, p_count (e.g., initial accumulator value) in a tracking store; and (c) enable the specified collective context. It is noted that p_count may refer to a countdown counter that tracks a number of participant TLPs received for a given collective operation. In some cases, an activate collective command may reuse stored collective information, which may include copying PBV, p_count, and/or accumulator data into a given tracking store.

Upon receipt of an inactivate or remove collective Type and/or Opcode field combination, the collective engine may clear the active bit for that context. Upon receipt of a message from one of the collective's participants, status updates may be performed and responses sent (e.g., when the collective is satisfied).

In one or more examples, collective processing may include at least one of the following operations: (a) read PBV from an active store and clear appropriate bit in the bit map (e.g., if the bit is already cleared, an error message may be sent); (b) read p_count from active store and decrement the count (e.g., if the count is already zero, an error message may be sent); (c) assuming an all-reduce message, the interim result may be read from the active store and added to the operand in the received message; (d) updated results may be fed back to the active stores and saved.

In some cases, master switch 306 may check whether a given collective context is satisfied (e.g., that p_count and PBV bitmap are both zero). When satisfied, collective engine 312 may pass context information to collective engine 312. In some cases, TLPs, destined for each participant in a given PBV group, may be generated (e.g., by master packet engine 310 of master switch 306, by packet engine 320 of local switch 308, and/or by packet engine 334 of remote switch 330, etc.). Collective engine 312 may perform route lookup for the TLPs (e.g., in an output queueing block).

In some examples, collectives may span a multitude of switches (e.g., master switch 306, local switch 308, remote switch 330, remote switch 332, etc.). A mechanism to coordinate the actions of each switch may be accomplished via in-band, inter-switch packets.

When a collective engine (e.g., collective engine 322) has been configured as a multi-switch collective, instead of sending a TLP to each participant upon satisfying the local collective conditions, a TLP may be sent to the collective master switch (e.g., master switch 306). After master switch 306 determines all of its local participants and remote switch participants have satisfied the collective's conditions, master switch 306 may send a completion message to each switch selected to participate in the collective operation. In some cases, master switch 306 may send the completion message to each participating node of each participating switch (e.g., each node of local switch 308, each node of remote switch 330, etc.). In some examples, subordinate switches (e.g., local switch 308, remote switch 330, etc.) may notify respective local participants (e.g., local node 326, local node 328, remote node 340, remote node 342, etc.) after receiving the completion message from master switch 306.

For example, remote switch 332 may receive the completion from master switch 306 and remote switch 332 may then send the completion to each of its local collective participants (e.g., remote node 350, remote node 352, etc.). In the case of an all-reduce, the master may send the final reduced data payload with the completion to the remote subordinate switches for distribution to the remote nodes. In some cases, the completion may have a payload that takes one of several forms depending on the performed collective operation. For a barrier operation, the payload may indicate barrier satisfied.

In some examples, source node 316 may be the selected as the collective master for a given context N. Source node 316 may assign collective engine 312 as the master engine for context N. Local node 318 may be the collective master for a second context M (e.g., where local node 318 is a source node of context M). Local node 318 may assigns collective engine 336 as the master engine for context M. Local node 318 may be configured to use collective engine 336 as its master engine based on 336 being an addressable endpoint (e.g. addressable entity). Source node 316 may have all the switches and local nodes (e.g., except local node 328) on local board 302 configured to participate in context N. Local node 318 may have all the switches and local nodes on remote board 304 participating in context M.

Assuming a given switch of system 300 has 32 local nodes attached, a connection may be provided between each switch on local board 302 and local board 304 (e.g., as a flattened butterfly). In some examples, 16 connections may be provided between switches on local board 302 and local board 304 (e.g., also as a flattened butterfly). In some cases, the connections may be configured with the same bandwidth.

For two all-reduce communications, one on context N and one on context M the following may occur. Source node 316 may send one packet to collective engine 312 to initiate the all-reduce for context N. Collective engine 312 may send fifteen packets, one to each subservient engine on board 302. In some cases, each subservient engine may send 32 frames to local nodes. Source node 316 may not be sent a frame as source node 316 is the initiator of the collective. Local node 318 may not be sent a frame because local node 318 is not a participant in collective N.

In some cases, a local node (e.g., each local node) may respond with its partial response to the subservient engine in the switch it is directly attached to. In some cases, a subservient switch (e.g., each subservient switch) may send a consolidated partial response for its local nodes to master packet engine 310. Master engine 310 may send a final response to a subservient engine (e.g., each subservient engine). In some cases, a subservient engine (e.g., each subservient engine) may send an instance of the final response to one or more locally attached nodes. As a result, each link gets only 3 frames crossing it (e.g., two going away from master engine 312 (initiating frame and final result), and 1 going toward master engine 312 (partial result)).

In some cases, a collective engine (e.g., each collective engine in each switch) may process two unique frames downstream and 32 unique frames upstream. Where downstream frames are replicated (e.g., 32 to end nodes), local node 318 may sends one packet to collective engine 336 to initiate the all-reduce context M. Traffic for context M may be substantially similar to that of context N described above. In some cases, the traffic of context M may be contained within local board 304 (e.g., except for the initiating frame and final result that go to local node 318 on local board 302). As a result, each link may have the same or substantially the same number of frames as context N. A given collective engine (e.g., each engine) may have the same number or substantially the same number of frames to process. Relatively minor differences in traffic count can occur due to different number of end nodes.

In some cases, the master for context M may not be assigned to collective engine 336 (e.g., because context M uses the locally connected collective engine 312). The traffic of context M may be similar to context N, except that collective engine 312 would then process twice the number of frames. As a result, there are longer delays to transmit data due to reduced parallelism in the processing. As a result, a single master engine is configured to process twice the frames of every other switch. Assuming 32B header and 1 kB payload frames at PCIe Gen7 speeds, it takes around 33 ns to serialize a frame. Thus, for just two contexts, initial distribution may be delayed by an additional 33 ns. If increased it to sixteen simultaneous contexts, a single master engine would now take 528 ns to send the frames, instead of 264 with two masters. System performance is increased based on increasing the number of masters.

Figure 4:
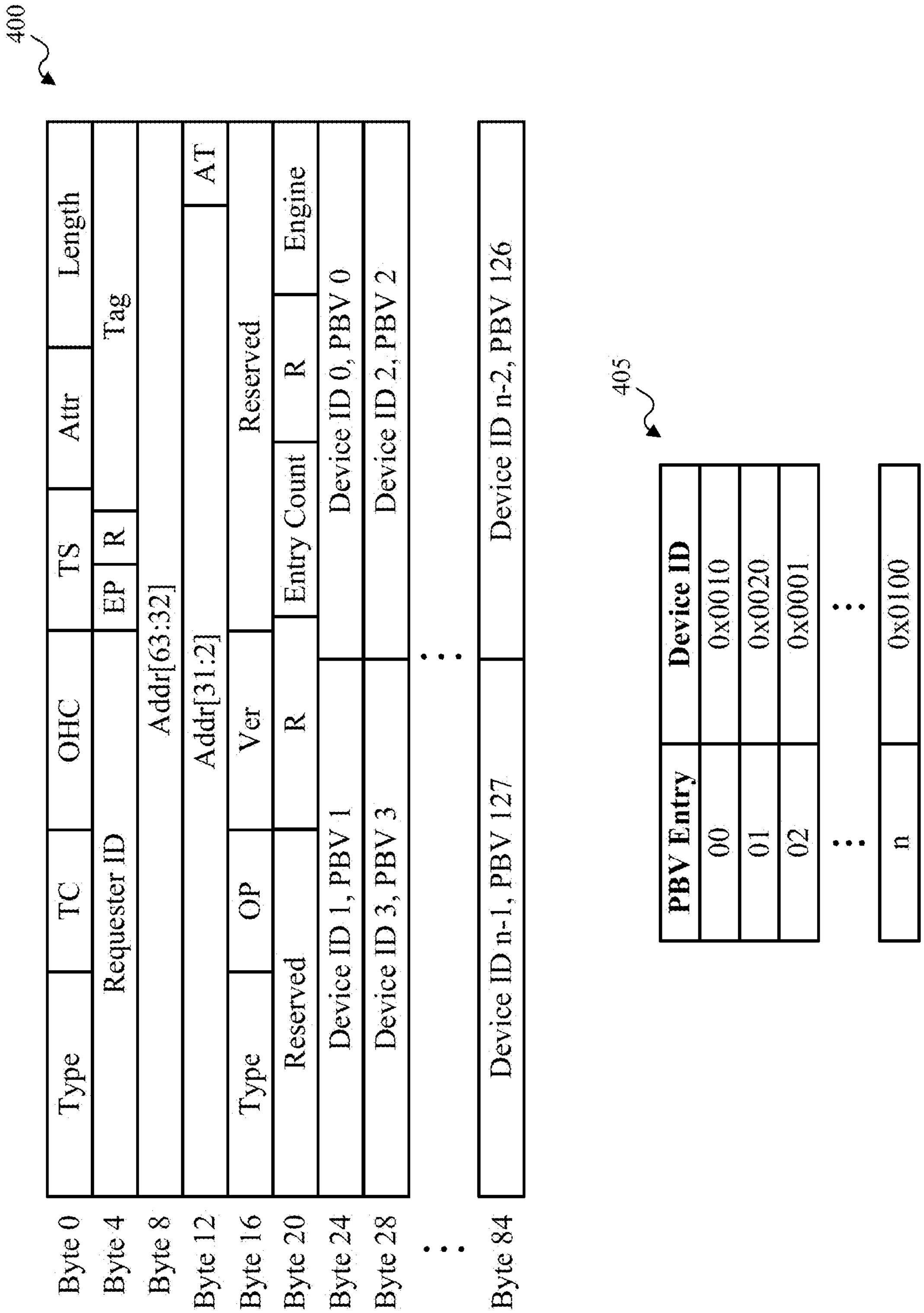
FIG. 4 illustrates a packet format in accordance with one or more implementations as described herein.

FIG. 4 illustrates an example packet 400 in accordance with one or more implementations as described herein. In the illustrated example, packet 400 may depict the format of a packet (e.g., multicast packet, multicast TLP). Packet 400 may be an example of a configuration packet (e.g., collective configuration packet). In some examples, packet 400 may be used for configuring one or more aspects of a collective group. Packet 400 may be configured unique for a given switch. For example, a first configuration packet based on packet 400 may be configured for a first switch and a second configuration packet based on packet 400 may be configured for a second switch, where the second configuration packet is different from the first configuration packet. A configuration packet based on packet 400 may set up various configuration items. In some cases, two switch engines may configure some items similarly, and other items differently. Configuration items that may be different per switch may include device IDs of locally attached nodes, PBV entries that the local device IDs are associated with, device IDs of any subservient engines. Configuration items that may or may not be different per switch may include physical port(s) of inner-switch links and/or timeouts. For example, a master switch engine may have a longer timeout than subservient switch engines in the hierarchy. For example, a master switch engine may be on the order of two or three times the timeout of subservient switch engines (e.g., to allow retries on the lower layer subservient switch engines). Configuration items that may be similar between switch engines may include protocol validation configuration, error reporting configuration, and the like.

As shown, FIG. 4 illustrates an example participant bit vector (PBV) table 405 in accordance with one or more implementations as described herein. In the illustrated example, the PBV table 405 may include a PBV entry and a device ID entry (e.g., columns of PBV entries, columns of device IDs, where a row includes a PBV entry and a device ID). As shown, a given PBV entry may be mapped to a given device ID (e.g., PBV entry 00 mapped to device ID 0x0010, PBV entry 01 mapped to device ID 0x0020, etc.).

In the illustrated example, packet 400 may include a type field that may indicate a type of TLP, Traffic Class (TC) field that may indicate a priority of a transaction as it travels through a PCIe link, an Orthogonal Header Content (OHC) field, a trailer size (TS), an attribute (Attr), a length of data payload field, the Requester ID field, an error forwarding (EP) bit field, a reserved (R) field, the tag field, and one or more encapsulated payload descriptors (e.g., encapsulated payload type field, encapsulated payload operation bit, encapsulated payload version, etc.). In some cases, packet 400 may represent an encapsulated packet (e.g., encapsulated multicast TLP). As shown, packet 400 may include an encapsulated packet header (e.g., encapsulated original multicast TLP header) and an encapsulated packet header (e.g., encapsulated original multicast TLP payload).

In some examples, packet 400 may be configured to support up to some number of PBVs (e.g., up to 128 PBVs in some configurations). In some examples, payload locations (e.g., 2 bytes each) in packet 400 may correspond to a specific PBV and may include a 16-bit device ID of a collective participant that is tracked by a collective engine. In some cases, hardware and/or firmware in a receiving switch may parse the frame and populate a PBV table (e.g., PBV table 405) that defines a relationship between a PBV and a device ID in the collective group. Based on system 300, collective engine 312 may generate at least three packets based on packet 400. Collective engine 312 may send a first configuration packet addressed to packet engine 320; send a second configuration packet addressed to packet engine 334; and send a third configuration packet addressed to packet engine 344.

It is noted that a PBV table may be configured in at least one of two or more ways. In some examples, a single relatively large packet for multiple switches may be transmitted by the master collective engine where the single relatively large packet associates multiple PBV tables with various device IDs for each switch. Hardware or firmware in a recipient switch may parse this frame and populate its respective table based on the device IDs associated with that particular switch, and so on. Additionally, or alternatively, a first packet with a first PBV table may be transmitted by the master collective engine to a memory location of a first switch to populate the PBV table of the first switch, a second packet with a second PBV table may be transmitted by the master collective engine to a memory location of a second switch to populate the PBV table of the second switch, and so on.

In some examples, a given switch (e.g., local switch 308) may have its own device ID and each packet engine within a switch (e.g., packet engine 320 of local switch 308) may have its own unique address space in a given system (e.g., system 300). So unlike multicast messages, master packet engine 310 may address a desired packet engine (e.g., packet engine 344) and the message may be routed through the system like any other traffic.

To configure a collective, master packet engine 310 may communicate with each packet engine directly (e.g., each respective packet addressed to a given packet engine). In some cases, the devices associated with PBVs in each switch may be different. In one example, device IDs local to local switch 308 may start with or include “0x00,” device IDs local to remote switch 330 may start with or include “0x01,” device IDs local to remote switch 332 may start with or include “0x02,” etc.

In some cases, buffers of a given switch may be increased in size to handle messages that are parsed and re-distributed. Scalability could be a concern as a system goes from five switches, for example, to a relatively large system with thousands of switches. In some cases, packet engine 320 may be configured as a packet engine at the top of a given hierarchy. Accordingly, to manage an existing collective, source node 316 may communicate a packet to collective engine 312, where collective engine 312 may be configured as a master collective engine. It is noted that “packet engine” and “collective engine” may be used interchangeably. Based on the packet from source node 316, master packet engine 310 may communicate (e.g., only communicate) with packet engine 320, and packet engine 320 may distribute messages and/or commands (e.g., initialize collective operation, pause collective operation, stop collective operation, reset collective operation, etc.) from master packet engine 310 to other packet engines in the collective group (e.g., to packet engine 334, packet engine 344, etc.). For example, packet engine 320 may propagate the results of a collective that does some type of function (barrier met, add, AND, etc.). The messages/commands from master packet engine 310 may be relatively similar, thus the hierarchy offloads source node 316. Accordingly, the systems and methods described herein generate packets in a relatively short time due to the parallelism of multiple packet engines generating frames concurrently (e.g., simultaneously) and reduce traffic on inter-switch links as engine-to-engine traffic traverses inter-switch links, compared to the relatively large number of packets used if the top level of the hierarchy (e.g., source node 316, collective engine 312) were to generate all the traffic to every endpoint.

In some cases, configuration is done by source node 316 (e.g., unique programming per engine instance relative to the payload/commands rather than the source/destination addresses). Control may be propagated by master packet engine 310 (e.g., identical command/status across all engines relative to the payload/commands rather than the source/destination addresses). To configure a collective, source node 316 may program addresses and provide the addresses to master packet engine 310. Master packet engine 310 may distribute configuration messages to one or more devices in the collective group (e.g., packet engine 320). In some examples, master packet engine 310 may provide to packet engine 320 (e.g., engine at the top of the hierarchy) addresses of subservient packet engines (e.g., packet engine 320, packet engine 334, packet engine 344, etc.) and/or PBV and device ID (e.g., PBV-device ID pairs) of collective participants in a collective group. In some cases, there may be a PBV/device ID pair for each subservient packet engine. Additionally, or alternatively, there may be a PBV/device ID pair for each locally attached endpoint participant (e.g., local node 318, local node 326, local node 328, remote node 340, remote node 342, remote node 350, remote node 352, etc.). In some cases, master packet engine 310 may provide to packet engine 320 any other configuration information such as hierarchy layout information, tasks of the collective operation, timeouts for packet engine responses, etc.

In some examples, source node 316 may program addresses of each level of subservient packet engines. In some cases, master packet engine 310 may program PBV and device IDs of directly attached collective participants, other than the node that sourced the collective operation (e.g., local node 318, nodes of master switch 306 other than source node 316, etc.). In some cases, there be a PBV/device ID pair for each locally attached end device participant (e.g., local node 318).

In some cases, master packet engine 310 may perform one or more operations to manage a collective operation. For example, source node 316 may issue a collective control message to master packet engine 310, and master packet engine 310 may propagate the control message. Packet engines may be configured as responsive entities, reacting to packets from the source node and/or response packets from remote nodes (e.g., packet engines acting as proxies for multiple remote nodes). In some cases, master packet engine 310 may distribute a message (e.g., an identical message) to packet engines and/or endpoint participants selected to be in a given collective group. In some cases, master packet engine 310 may restart a collective operation, end a collective operation, report errors to subservient packet engines (e.g., at least to packet engine 320), etc.

Figure 5:
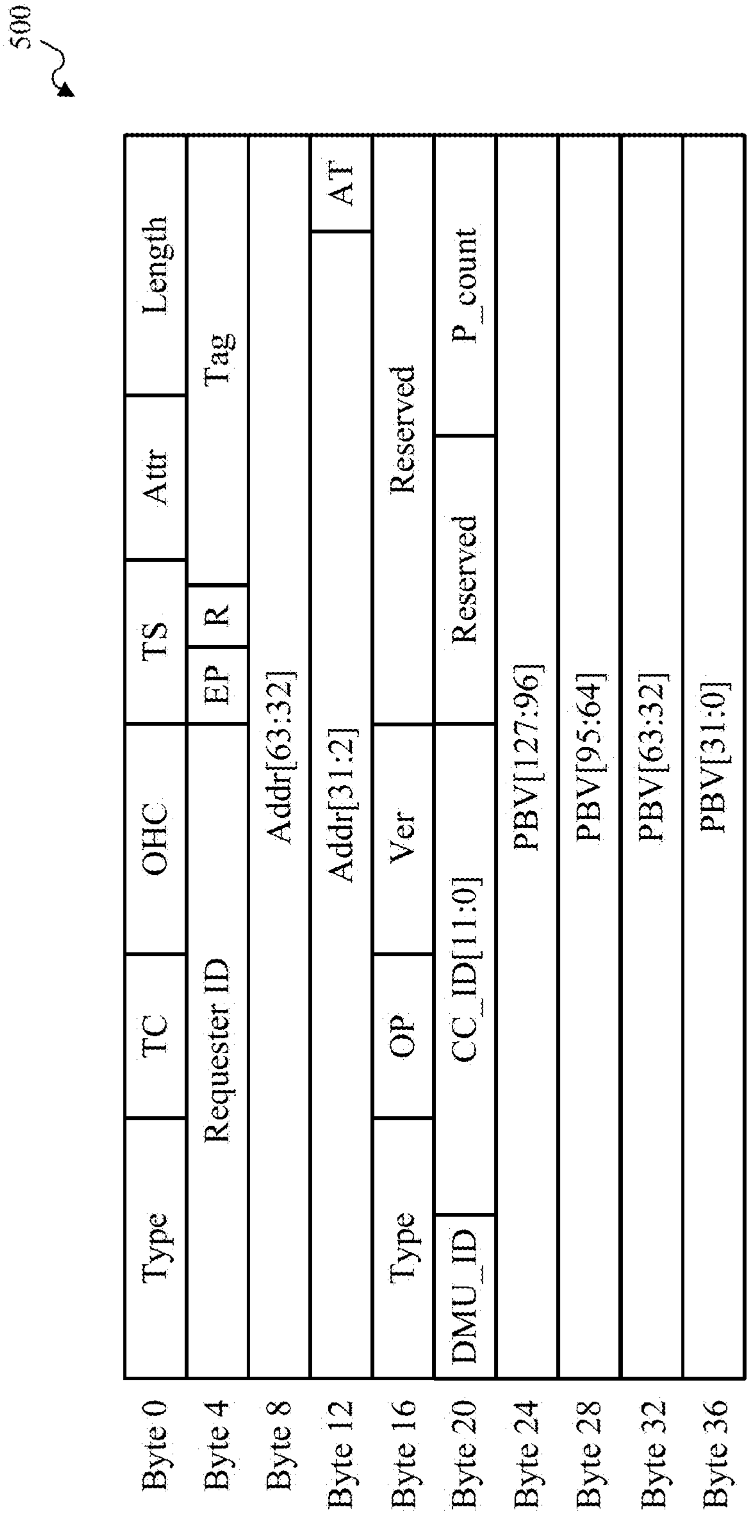
FIG. 5 illustrates a packet format in accordance with one or more implementations as described herein.

FIG. 5 illustrates an example packet 500 in accordance with one or more implementations as described herein. In the illustrated example, packet 500 may depict the format of a packet (e.g., multicast packet, multicast TLP). Packet 500 may be an example of an initialization packet (e.g., barrier context initialization packet). In some examples, packet 500 may be used for initializing a collective group. In some examples, an initialization packet based on packet 500 may assign participants a collective group identifier (e.g., CC_ID) of a collective group.

In the illustrated example, packet 500 may include one or more fields similar to or based on one or more fields of packet 400. As shown, packet 500 may include one or more PBV fields for a given PBV table. In the illustrated example, a PBV table may include 128 bits or 16 bytes. As shown, one PBV field may include 4 bytes, and the values in a set of PBV fields may be based on the values of a PBV table. A shown, packet 500 may include bits of a PBV table set in payload bytes 24 to 36 to indicate which PBVs are participating in a given collective group.

A packet based on packet 500 may indicate which devices of a given PBV table are included in a collective group (e.g., CC_ID). Based on system 300, source node 316 may generate at least three packets based on packet 400. Source node 316 may send the first initialization packet (e.g., with a first PBV table) addressed to packet engine 320; send the second initialization packet (e.g., with a second PBV table) addressed to packet engine 334; and send the third initialization packet (e.g., with a third PBV table) addressed to packet engine 344.

Figure 6:
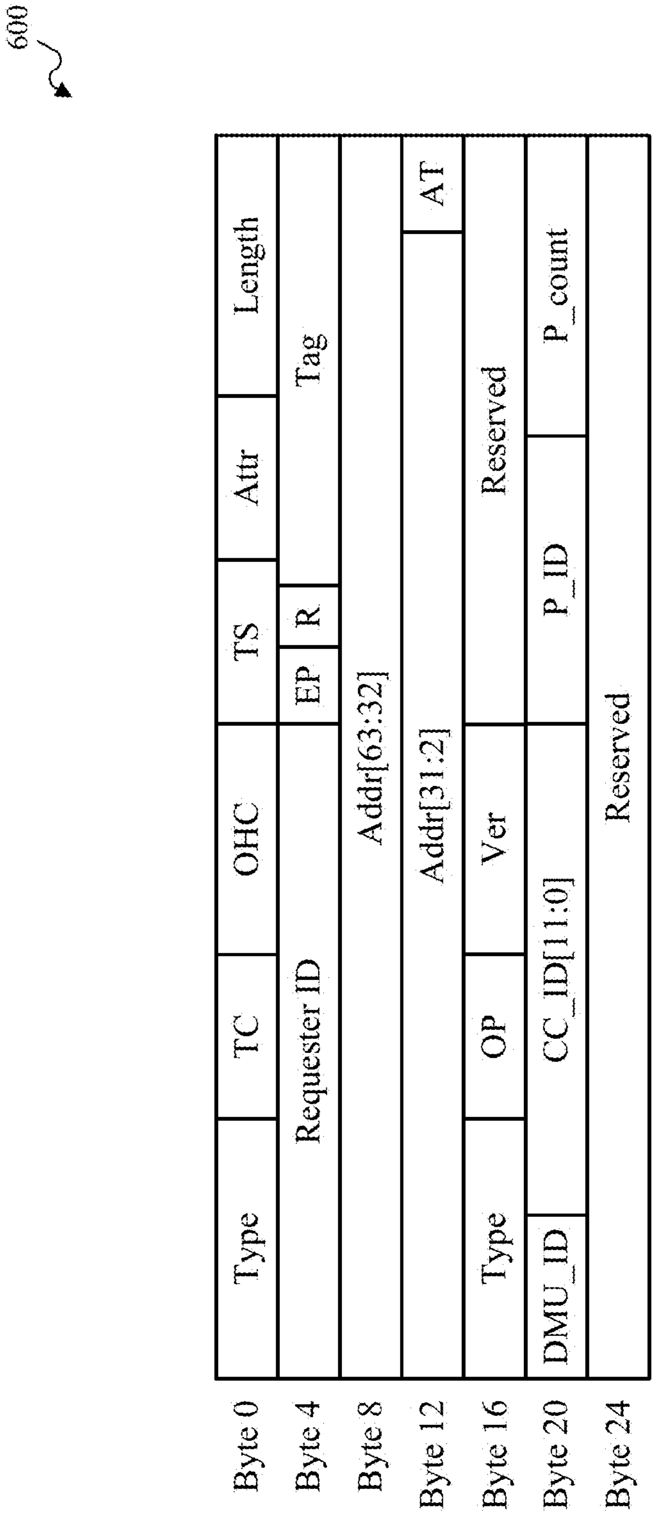
FIG. 6 illustrates a packet format in accordance with one or more implementations as described herein.

FIG. 6 illustrates an example packet 600 in accordance with one or more implementations as described herein. In the illustrated example, packet 600 may depict the format of a packet (e.g., multicast packet, multicast TLP). Packet 600 may be an example of a control packet (e.g., collective control packet). In some examples, packet 600 may be used for controlling one or more aspects of a collective group. In some examples, a first control packet based on packet 600 may be similar (e.g., identical) to a second control packet based on packet 600. In some cases, a switch may receive a control packet and send one or more copies of the received control packet to any subordinate participants (e.g., local nodes of that switch). In some cases, a control packet based on packet 600 may control one or more aspects of a collective operation (e.g., start a collective operation, pause a collective operation, restart a collective operation, stop a collective operation, reset a collective operation, etc.).

In the illustrated example, packet 600 may include one or more fields similar to or based on one or more fields of packet 400 and/or packet 500. As shown, packet 600 may include at least one DMU_ID field (e.g., endpoint identifier field); a CC_ID field (e.g., collective group identifier, 12-bit collective group identifier); a participant identifier (P_ID) field; and a participant count (P_count) field, among other fields. In some cases, P_ID may be associated with the PBV of an end device. In some cases, P_ID may save a switch from having to do a reverse lookup, where the switch would look up the PBV based on the requester ID.

Based on configuring a given collective group (e.g., with collective group CC_ID, a control frame type may be sent (e.g., by collective engine 312, by master packet engine 310, by master switch 306) to control one or more aspects of that collective group.

In some examples, a master collective processor (e.g., source node 316) may send one packet based on packet 600 addressed to a collective engine that is configured (e.g., based on a configuration packet) as a top switch of a collective hierarchy of a given collective group. In some examples, local switch 308 may be configured by source node 316 to be a top switch of a collective hierarchy of a given collective group. Accordingly, collective engine 312 may interface with local switch 308, on behalf of source node 316 (e.g., based on one or more messages/packets from source node 316), and local switch 308 may interface with other switches in the collective group on behalf of collective engine 312.

A top-level collective engine, under direction of source node 316, may be responsible for distributing a control packet based on packet 600 to lower-level collective engine(s). In turn, lower-level collective engines may distribute the control packet (e.g., copies of the control packet) to their participating endpoint devices (e.g., nodes) as configured in the PBV table of a given collective engine. Accordingly, collective engine 312, under direction of source node 316, may be tasked with the responsibility of distributing a control packet based on packet 600 to collective engine 322. In turn, collective engine 322 may distribute the control packet (e.g., copies of the control packet) to collective engine 336 and/or collective engine 346. Additionally, or alternatively, collective engine 322 may distribute the control packet to at least local node 326 and/or local node 328. In turn, collective engine 336 may distribute the control packet to at least collective engine 346. Additionally, or alternatively, collective engine 336 may distribute the control packet to at least remote node 340 and/or remote node 342.

Figure 7:
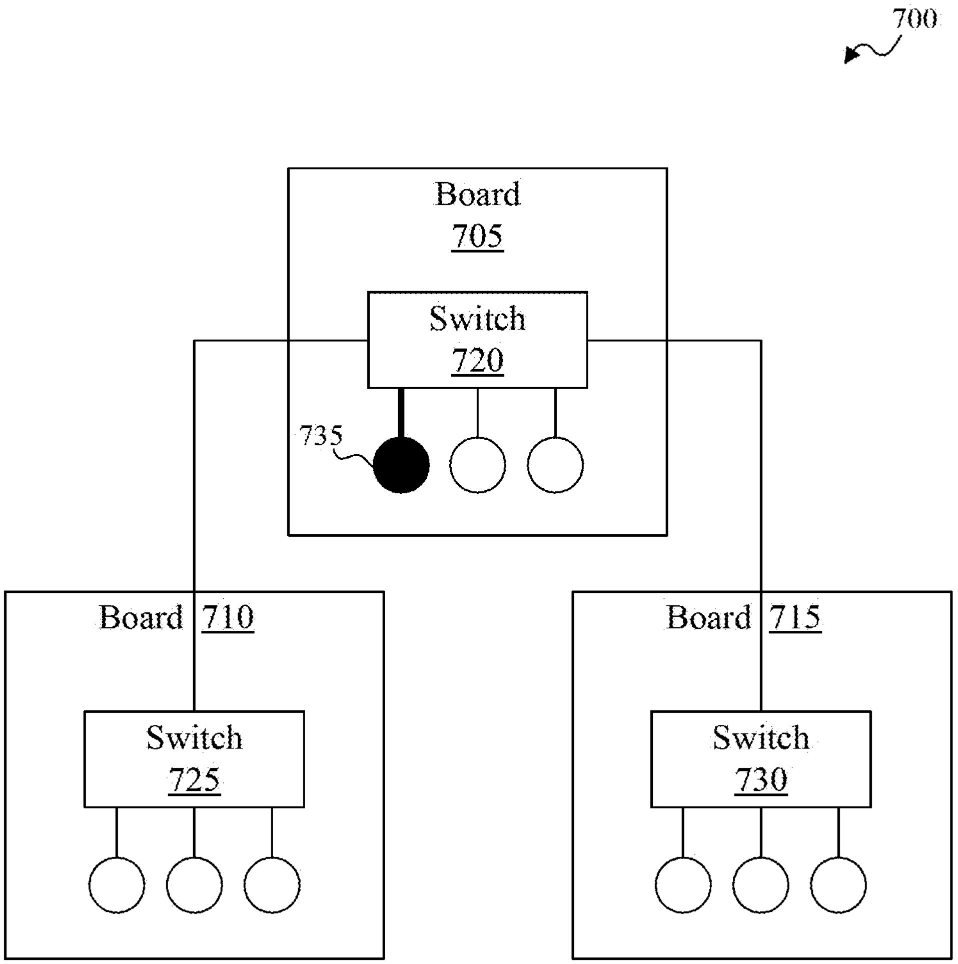
FIG. 7 illustrates an example system in accordance with one or more implementations as described herein.

FIG. 7 illustrates an example system 700 in accordance with one or more implementations as described herein. In the illustrated example, system 700 may include board 705, board 710, and board 715. As shown, board 705 may include switch 720, board 710 may include switch 725, and board 715 may include switch 730. As shown, switch 720 may include source node 735. Board 705 may be an example of local board 302; board 710 or board 715 may be an example of remote board 304. Switch 720 may be an example of master switch 306; switch 725 may be an example of local switch 308; switch 730 may be an example of remote switch 330; source node 735 may be an example of source node 316.

In some examples, switch 720 may be a switch of a first board, switch 725 may be a switch of a second board, and switch 730 may be a switch of a third board. As shown, each board may include at least one switch, and each switch may include at least three endpoint devices (e.g., at least three nodes). Switch 720 may be a master switch, while switch 725 and switch 730 may be subservient switches in a two-level hierarchy. The device IDs of the respective components of system 700 may be addressed as provided in the following tables, where Table 2 may provide the device IDs of the components of board 705; Table 3 may provide the device IDs of the components of board 710; and Table 4 may provide the device IDs of the components of board 715.

TABLE 2

| DEVICE | DEVICE ID |
|---|---|
| Board 705, Switch 720 | 0x0000 |
| Board 705, Source node 735 | 0x0001 |
| Board 705, Node 1 | 0x0002 |
| Board 705, Node 2 | 0x0003 |

TABLE 3

| DEVICE | DEVICE ID |
|---|---|
| Board 710, Switch 725 | 0x0010 |
| Board 710, Node 0 | 0x0011 |
| Board 710, Node 1 | 0x0012 |
| Board 710, Node 2 | 0x0013 |

TABLE 4

| DEVICE | DEVICE ID |
|---|---|
| Board 715, Switch 730 | 0x0020 |
| Board 715, Node 0 | 0x0021 |
| Board 715, Node 1 | 0x0022 |
| Board 715, Node 2 | 0x0023 |

In some examples, a packet engine may be at base address of each switch (e.g., 0xC000 based on a 32-bit address). When a master packet engine of switch 720 configures the respective packet engines of switch 725 and switch 730, the master packet engine may write to register locations with addresses as shown below, where "yy" may be the address block of PBV registers.

| | |
|---|---|
| 0x0000_C0yy | 5x writes |
| 0x0010_C0yy | 3x writes |
| 0x0020_C0yy | 3x writes |

In some examples, the writes may configure each switch's PBV table entries with device IDs. As shown in Table 5, switch 720 may have five devices programmed into its PBV table: PBV0 mapped to device ID of switch 725; PBV1 mapped to device ID of switch 730; PBV2 mapped to device ID of source node 735; PBV3 mapped to second node of switch 720; PBV4 mapped to third node of switch 720.

TABLE 5

| PBV Entry | DEVICE ID |
|---|---|
| PBV 0 | 0x0010 |
| PBV 1 | 0x0020 |

TABLE 5-continued

| PBV Entry | DEVICE ID |
|---|---|
| PBV 2 | 0x0001 |
| PBV 3 | 0x0002 |
| PBV 4 | 0x0003 |

As shown in Table 6, switch 725 may have three devices programmed into its PBV table: PBV0 mapped to device ID of the first node of switch 725; PBV1 mapped to device ID of second node of switch 725; PBV2 mapped to device ID of third node of switch 725.

TABLE 6

| PBV Entry | DEVICE ID |
|---|---|
| PBV 0 | 0x0010 |
| PBV 1 | 0x0020 |
| PBV 2 | 0x0001 |

As shown in Table 7, switch 730 may have three devices programmed into its PBV table: PBV0 mapped to device ID of the first node of switch 730; PBV1 mapped to device ID of second node of switch 730; PBV2 mapped to device ID of third node of switch 730.

TABLE 7

| PBV Entry | DEVICE ID |
|---|---|
| PBV 0 | 0x0010 |
| PBV 1 | 0x0020 |
| PBV 2 | 0x0001 |

When assigning devices to collectives, the master packet engine of switch 720 may send a command to each participating switch (e.g., switch 725, switch 730) to indicate which participants are in a given collective.

In some examples, collective #0 (CC_ID=0x000, first collective group) may have all end devices included, resulting in the following PBVs being set:

| | | |
|---|---|---|
| Switch 720 | 0x001f | representing 5 devices |
| Switch 725 | 0x0007 | representing 3 devices |
| Switch 730 | 0x0007 | representing 3 devices |

Collective #1 (CC_ID=0x001, second collective group) may exclude switch 730 and any endpoint devices of switch 730, resulting in the following PBVs being set:

| | | |
|---|---|---|
| Switch 0 | 0x001d | representing 4 devices (switch 730 not set) |
| Switch 1 | 0x0007 | representing 3 devices |
| Switch 2 | n/a | not in collective |

Collective #2 (CC_ID=0x002, third collective group) may include all end devices depicted in system 700, except the third node of switch 725, resulting in the following PBVs being set:

| | | |
|---|---|---|
| Switch 0 | 0x001f | representing 5 devices |
| Switch 1 | 0x0003 | representing 2 devices (third node not included) |
| Switch 2 | 0x0007 | representing 3 devices |

Accordingly, the packet engines in each depicted switch of system 700 may be configured to support three independent collectives. In some examples, the master collective node engine of 735 may send a command to switch 720 (e.g., packet engine of switch 720) instructing switch 720 to set up a collective barrier operation for collective #2, resulting in at least one of the following operations:

Switch 720 receives set up barrier command from source node 735;

Switch 720 sends command to switch 725 and switch 730;

Switch 720 sends command to all locally attached devices (e.g., nodes of switch 720);

Switch 725 receives set up barrier command from switch 720;

Switch 725 sends set up barrier command to locally attached devices (e.g., first and second nodes of switch 725 as the third node of switch 725 is not included in the collective);

Switch 730 receives the set up barrier command from switch 720;

Switch 730 sends set up barrier command to all locally attached devices (e.g., first, second, and third node of switch 730).

As each endpoint device satisfies the barrier, at least one of the following may occur:

Switch 720 receives barrier met messages from its locally attached devices (e.g., second and third nodes of switch 720);

Switch 720 does not have a resultant transmission;

Switch 725 receives barrier met messages from its locally attached devices (e.g., first and second nodes of switch 725 as the third node of switch 725 is not included in the collective);

Switch 725 sends a barrier met message to switch 720;

Switch 730 receives barrier met message from one of its locally attached devices (e.g., first node of switch 730);

Switch 720 receives barrier met message from switch 725;

Switch 730 receives remaining barrier met messages from remaining locally attached devices (e.g., from second and third nodes of switch 730);

Switch 730 sends a barrier met message to switch 720;

Switch 720 receives barrier met message from switch 730;

Switch 720 sends a first barrier collective satisfied message to switch 725;

Switch 720 sends a second barrier collective satisfied message (e.g., a copy of the first barrier collective satisfied message) to switch 730;

Switch 720 sends a third set of barrier collective satisfied messages (e.g., a copy of the first barrier complete message) to its locally attached devices (e.g., source node 735 as wells the second and third nodes of switch 720);

Switch 725 receives the first barrier collective satisfied message from switch 720;

Switch 725 sends respective copies of the first barrier collective satisfied message to its participating locally attached devices (e.g., first and second nodes of switch 725 as the third node of switch 725 is not included in the collective);

Switch 730 receives the second barrier collective satisfied message from switch 720;

Switch 730 sends respective copies of the second barrier collective satisfied message to its participating locally attached devices (e.g., first, second, and third nodes of switch 730)

In some cases, switch 725 and/or switch 730 may wait for their respective PBVs (e.g., representing their end devices)

to be satisfied before transmitting a barrier met message to switch 720. In some cases, switch 720 may wait for its local PBV (e.g., representing switches and end devices) to be satisfied before sending out a barrier collective satisfied message.

In some examples, switch 725 or switch 730 may be configured as a master switch for some collective operations. For example, switch 725 configured as a master switch may configure switch 720 and switch 730 as subservient switches, etc. Accordingly, switch 720 may report to switch 725 and switch 730 may report to switch 725 via switch 720. In some cases, switch 730 may route traffic through switch 720, bypassing a packet engine of switch 720, addressing packets to a packet engine of switch 725.

Figure 8:
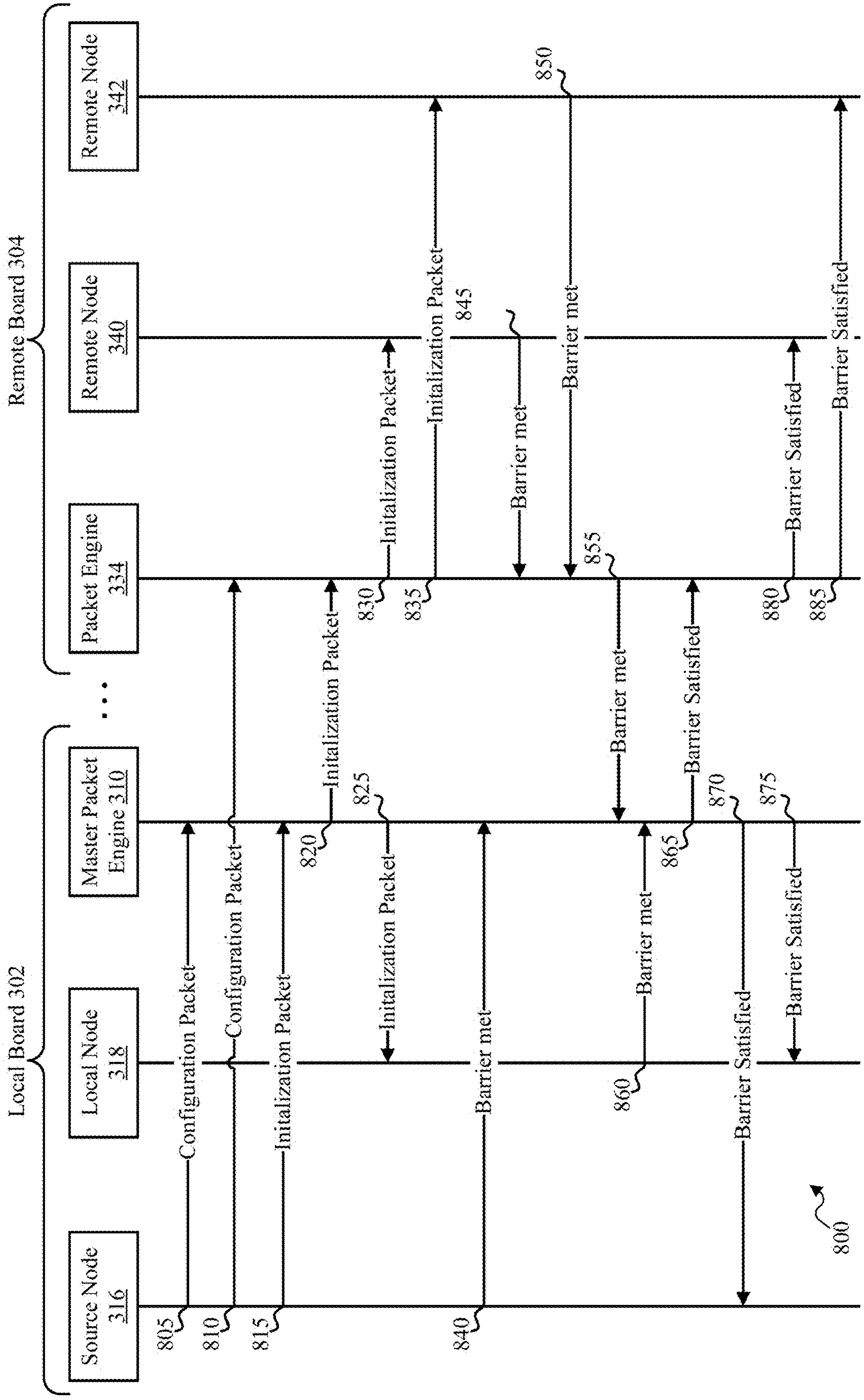
FIG. 8 depicts a diagram illustrating an example method associated with the disclosed systems, in accordance with example implementations described herein.

FIG. 8 illustrates an example diagram 800 (e.g., a ladder diagram) in accordance with one or more implementations as described herein. In the illustrated example, diagram 800 depicts master packet engine 310, local node 318, and source node 316 of local board 302. As shown, diagram 800 depicts packet engine 334, remote node 340, and remote node 342 of remote board 304. Although diagram 800 depicts interaction between local board 302 and remote board 304, it is understood that the depicted operations may occur between local 302 board and multiple remote boards (e.g., N remote boards, where N is a positive integer) including the depicted remote board 304. Master packet engine 310 may be part of a local switch (e.g., master switch 305), while packet engine 334 may be part of a remote switch (e.g., remote switch 330). In some cases, the depicted operations may represent operations multiple packet engines of local board 302, and/or operations of multiple packet engines of remote board 304. It is noted that an operation of master packet engine 310 sending and/or receiving messages may include collective engine 312 sending and/or receiving at least one such message. It is noted that an operation of packet engine 334 sending and/or receiving messages may include collective engine 336 sending and/or receiving at least one such message.

At 805, source node 316 may send a configuration packet (e.g., a first copy of a configuration packet based on packet 400) addressed to master packet engine 310.

At 810, source node 316 may send a configuration packet (e.g., a second copy of the configuration packet based on packet 400) addressed to packet engine 334.

At 815, source node 316 may send an initialization packet (e.g., a first copy of an initialization packet based on packet 500) addressed to master packet engine 310.

At 820, master packet engine 310 may send an initialization packet (e.g., a second copy of the initialization packet based on packet 500) addressed to packet engine 334. As shown, one hop occurs between master packet engine 310 and packet engine 334. In some cases, master packet engine 310 may communicate an initialization packet to another packet engine via packet engine 334, where the communication includes two or more hops from master packet engine 310 to packet engine 334, and from packet engine 334 to at least one other packet engine.

At 825, master packet engine 310 may send an initialization packet (e.g., a third copy of the initialization packet based on packet 500) addressed to local node 318.

At 830, packet engine 334 may send an initialization packet (e.g., a fourth copy of the initialization packet based on packet 500) addressed to remote node 340.

At 835, packet engine 334 may send an initialization packet (e.g., a fifth copy of the initialization packet based on packet 500) addressed to remote node 342.

At 840, source node 316 may send a barrier met status message to master packet engine 310.

At 845, remote node 340 may send a barrier met status message to packet engine 334 indicating that tasks of the collective group assigned to remote node 340 (are completed.

At 850, remote node 342 may send a barrier met status message to packet engine 334 indicating that tasks of the collective group assigned to remote node 342 are completed.

At 855, packet engine 334 may send a barrier met status message to master packet engine 310 indicating that tasks of the collective group assigned to packet engine 334 (e.g., and any subordinate switches/nodes of packet engine 334) are completed. As shown, switches/nodes subordinate to packet engine 334 may include remote node 340 and/or remote node 342. Accordingly, when packet engine 334 determines that all tasks assigned to its subordinate switches/nodes are completed, then packet engine 334 may send the barrier met status message to master packet engine 310 indicating that its assigned tasks are completed.

At 860, local source node 316 may send a barrier met status message to master packet engine 310, where the barrier met status message indicates that the tasks of the collective group assigned to local source node 316 are completed. For example. Local node 316 may indicate that a final participant has indicated that its task is completed, indicating that all participants have completed their assigned tasks of the collective group.

At 865, master packet engine 310 may send a first copy of the collective barrier satisfied message to packet engine 334, indicating the tasks of the collective group are complete. Before receiving the collective barrier satisfied message, an end device (e.g., local node 318) may be barred from processing any other task outside of the collective group. Based on receiving the collective barrier satisfied message, the recipient (e.g., local node 318) may be allowed to perform other tasks (e.g., of another collective group).

At 870, master packet engine 310 may send a second copy of a collective barrier satisfied message to source node 316. As shown, switches/nodes subordinate to master packet engine 310 may include local node 318, packet engine 334, remote node 340, and/or remote node 342. Accordingly, when master packet engine 310 determines that all tasks assigned to its subordinate switches/nodes are completed, then master packet engine 310 may send one or more collective barrier satisfied messages (e.g., send the barrier satisfied message to source node 316).

At 875, master packet engine 310 may send a third copy of the collective barrier satisfied message to local node 318, indicating the tasks of the collective group are complete.

At 880, packet engine 334 may send a fourth copy of the collective barrier satisfied message to remote node 340, indicating the tasks of the collective group are complete.

At 885, packet engine 334 may send a fifth copy of the collective barrier satisfied message to remote node 342, indicating the tasks of the collective group are complete.

It is noted that one or more collective operations may be executed concurrently. For example, of the multiple collective operations that may be executing at any given time, a first set of nodes (e.g., source node 316, local node 318, remote node 340, remote node 342) may be configured to execute tasks of a first collective operation (e.g., the collective operation depicted in FIG. 8), while a second set of nodes may be configured to execute a second collective operation separate from the first collective operation, and so on. In some examples, the first collective operation may be part of a first distributed collective engine of a first group of collective engines tasked to execute respective portions of the first collective operation, while the second collective operation may be part of a second distributed collective engine of a second group of collective engines, separate from the first group of collective engines, and tasked to execute respective portions of the second collective operation. The second group of collective engines may include a second master collective engine and a group of subservient collective engines (e.g., second group of collective engines). The second group of collective engines may include a group of collective engines selected to be part of the second distributed collective engine. For example, a second local node subordinate to a source node of a switch (e.g., a switch of local board 302, a switch of remote board 304, a switch not depicted in FIG. 8, etc.) may be one node of multiple nodes tasked to execute the second collective operation. In some cases, the second local node may be configured to perform one or more tasks of the second collective operation, exchange one or more collective messages of the second collective operation with the second group of collective engines of the second distributed collective engine in conjunction with execution of the second collective operation, provide a partial result of the second collective operation to a source node of the second distributed collective engine, receive a final result of the second collective operation from a collective engine of the second group of collective engines, and so on.

In some examples, source node 316 may configure all switches of a collective group directly (e.g., messages from source node 316 addressed directly to each packet engine included in the collective group). In some cases, source node 316 may communicate the configuration information directly to all the switches, local and remote. The mechanism source node 316 may use to communicate the configuration information may be based on a series of memory writes to respective configuration spaces of packet engines in each switch (e.g., a first memory write to a configuration space of a first packet engine of a first switch, a second memory write to a configuration space of a second packet engine of the first switch or of a second switch, etc.). A given local switch may forward configuration packets not addressed for its own packet engine. The configuration information of a configuration packet may indicate each switch, packet engine, node, device, etc., that the source node has selected to be included in the collective group.

In some cases, source node 316 may provide the configuration information to a local switch. For example, source node 316 may send to the local switch the configuration information for all switches in the collective group, and the local switch may then generate a configuration packet for each other switch in the collective group. In some cases, the systems and methods may provide buffering and/or configuration packet generation logic in each packet engine on every switch to handle the communication of collective-related packets (e.g., configuration packets, initialization packets, etc.). In some cases, source node 316 may send a configuration packet with a relatively large payload (e.g., to a local switch highest in the hierarchy of subservient switches), where the configuration packet with the relatively large payload may include the configuration information for all switches in the collective group.

Figure 9:
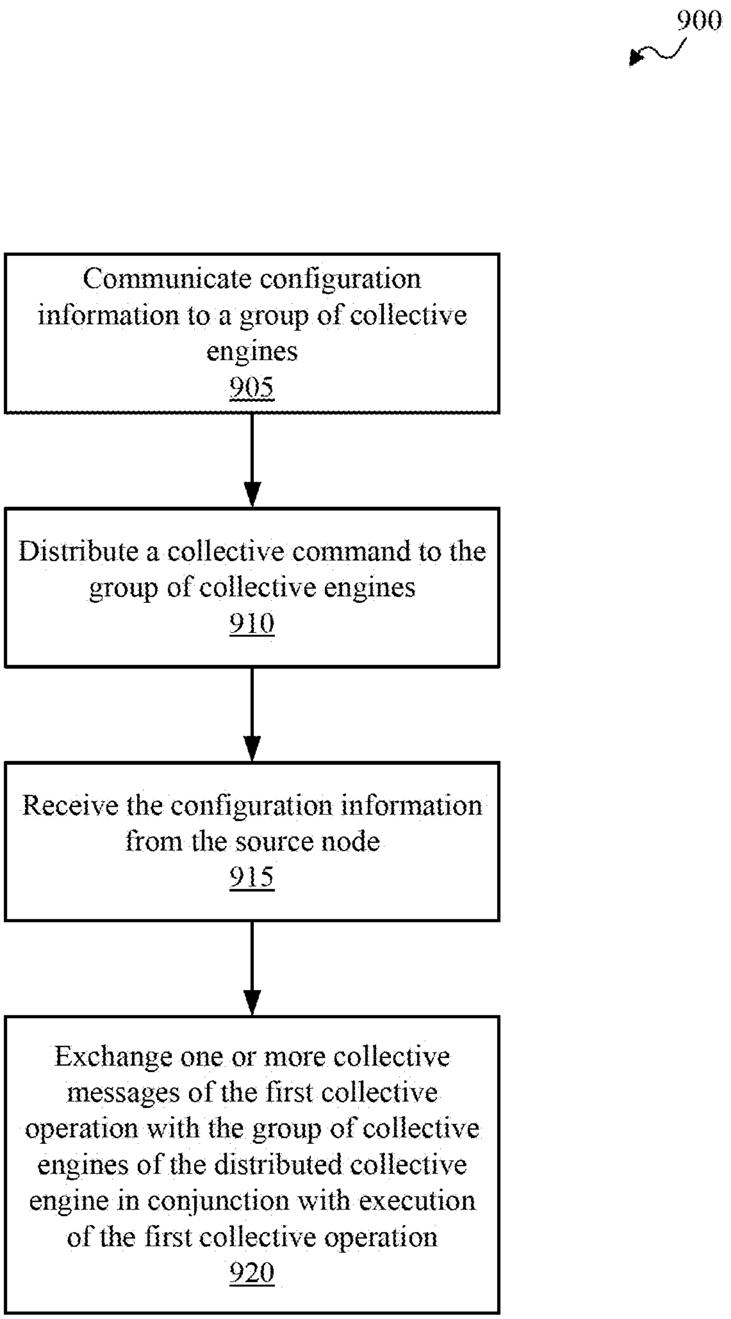
FIG. 9 depicts a flow diagram illustrating an example method associated with the disclosed systems, in accordance with example implementations described herein.

FIG. 9 depicts a flow diagram illustrating an example method 900 associated with the disclosed systems, in accordance with example implementations described herein. In some configurations, method 900 may be implemented by collective engine 140 of FIG. 1 and/or collective engine 230 of FIG. 2. In some configurations, method 900 may be implemented in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include communicating configuration information to a group of collective engines. For example, a node (e.g., source node, master node) may communicate configuration information to a group of collective engines. The configuration information may be received by each collective engine in the group of collective engines and may be used by each collective engine to configure the group of collective engines as a distributed collective engine of a first collective operation. The configuration information may indicate the source node is a master node of the first collective operation and that a local node of the first switch and a remote node of a second switch are subordinate to the source node in the first collective operation.

At 910, method 900 may include distributing a collective command to the group of collective engines. For example, a node (e.g., source node, master node) may distribute a collective command to the group of collective engines.

At 915, method 900 may include receiving the configuration information from the source node. For example, a master collective engine may receive the configuration information from the source node. In some cases, the source node may distribute the configuration information to one or more local nodes of the first switch and/or to one or more remote nodes of collective engines subservient to the master collective engine.

At 920, method 900 may include exchanging one or more collective messages of the first collective operation with the group of collective engines of the distributed collective engine in conjunction with execution of the first collective operation. For example, a master collective engine may exchange one or more collective messages of the first collective operation with the group of collective engines of the distributed collective engine in conjunction with execution of the first collective operation. In some examples, the master collective engine may exchange one or more collective messages of the first collective operation with one or more subservient collective engines and participating nodes, which may include one or more local nodes and/or one or more remote nodes. The group of collective engines may include the master collective engine and a group of subservient collective engines. The group of subservient collective engines may include a second collective engine of the second switch and a third collective engine of a third switch, and so on.

In some cases, method 900 may include receiving (e.g., by the master collective, by the source node) one or more results from one or more subservient collective engines and/or from one or more participating nodes (e.g., local nodes, remote nodes). The one or more results may indicate collective task completion, collective barrier met, and/or another collective command result.

Figure 10:
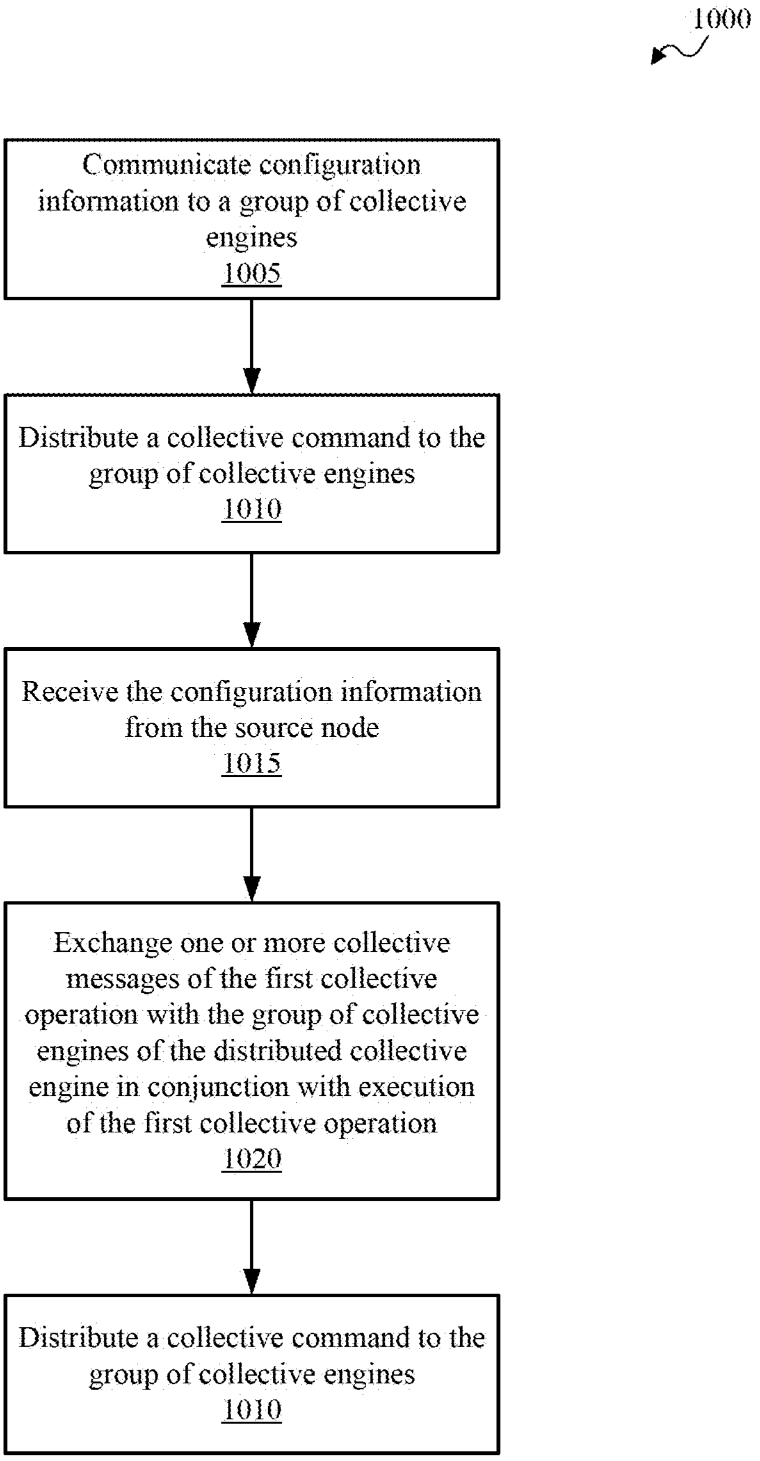
FIG. 10 depicts a flow diagram illustrating an example method associated with the disclosed systems, in accordance with example implementations described herein.

FIG. 10 depicts a flow diagram illustrating an example method 1000 associated with the disclosed systems, in accordance with example implementations described herein. In some configurations, method 1000 may be implemented by collective engine 140 of FIG. 1 and/or collective engine 230 of FIG. 2. In some configurations, method 1000 may be implemented in conjunction with machine 105, components of machine 105, or any combination thereof. The depicted method 1000 is just one implementation and one or more operations of method 1000 may be rearranged, reordered, omitted, and/or otherwise modified such that other implementations are possible and contemplated.

At 1005, method 1000 may include communicating configuration information to a group of collective engines. For example, a node (e.g., source node, master node) may communicate configuration information to a group of collective engines. The configuration information may be received by each collective engine in the group of collective engines and may be used by each collective engine to configure the group of collective engines as a distributed collective engine of a first collective operation. The configuration information may indicate the source node is a master node of the first collective operation and that a local node of the first switch and a remote node of a second switch are subordinate to the source node in the first collective operation.

At 1010, method 1000 may include distributing a collective command to the group of collective engines. For example, a node (e.g., source node, subservient node) may distribute a collective command to the group of collective engines.

At 1015, method 1000 may include receiving the configuration information from the source node. For example, a master collective engine may receive the configuration information from the source node. In some cases, the source node may distribute the configuration information to one or more local nodes of the first switch and/or to one or more remote nodes of collective engines subservient to the master collective engine.

At 1020, method 1000 may include exchanging one or more collective messages of the first collective operation with the group of collective engines of the distributed collective engine in conjunction with execution of the first collective operation. For example, a master collective engine may exchange one or more collective messages of the first collective operation with the group of collective engines of the distributed collective engine in conjunction with execution of the first collective operation. In some examples, the master collective engine may exchange one or more collective messages of the first collective operation with one or more subservient collective engines and participating nodes, which may include one or more local nodes and/or one or more remote nodes. The group of collective engines may include the master collective engine and a group of subservient collective engines. The group of subservient collective engines may include a second collective engine of the second switch and a third collective engine of a third switch, and so on.

At 1025, method 1000 may include receiving, based on the collective command, one or more partial results from the group of collective engines and/or from one or more subordinate nodes of the first switch. For example, the master collective engine may receive, based on the collective command, one or more partial results from the group of collective engines and/or from one or more subordinate nodes of the first switch. In some cases, the master collective engine may communicate a consolidated response to the source node based on receipt of all partial results, where the master collective engine may distribute the final result to the group of subservient collective engines. In some examples, the master collective engine may distribute the final result to one or more local nodes. Additionally, or alternatively, at least one subservient collective engine may receive the final result and distribute the final result to one or more nodes local to the at least one subservient collective engine. In some cases, when a failure occurs (e.g., timeout error, etc.), a subservient engine may still send a partial result, where the partial result may indicate or may be marked as an error.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A first switch comprising:

a source node to:

communicate configuration information to a group of collective engines, the group of collective engines being configured as a distributed collective engine of a first collective operation, the configuration information indicating the source node is a master node of the first collective operation and that a local node of the first switch and a remote node of a second switch are subordinate to the source node in the first collective operation; and distribute a collective command to the group of collective engines; and a master collective engine to:

receive the configuration information from the source node; and exchange one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

2. The first switch of claim 1, wherein: communication between the second collective engine and the master collective engine comprises one hop based on the second switch being connected to the first switch, and communication between the third collective engine and the master collective engine comprises two hops based on the third switch connecting to the first switch via the second switch.

3. The first switch of claim 1, wherein distributing the collective command to the group of collective engines is based on: the source node providing the collective command to the master collective engine, and the master collective engine replicating the collective command and distributing the replicated collective command to the group of subservient collective engines.

4. The first switch of claim 3, wherein the master collective engine is further configured to distribute a copy of the replicated collective command to one or more subordinate nodes of the first switch, the first switch comprising at least the source node and the one or more subordinate nodes, the one or more subordinate nodes including the local node of the first switch.

5. The first switch of claim 1, wherein the master collective engine is further configured to: receive, based on the collective command, a plurality of partial results from the group of collective engines and one or more subordinate nodes of the first switch; communicate a consolidated response to the source node based on receipt of the plurality of partial results; and distribute a final result to the group of subservient collective engines.

6. The first switch of claim 5, wherein the master collective engine is further configured to distribute the final result to the one or more subordinate nodes of the first switch, including the local node of the first switch.

7. The first switch of claim 5, wherein receiving the plurality of partial results includes the master collective engine receiving a first response to the collective command from the local node of the first switch and the master collective engine providing the first response to the source node, the first response including at least a first partial result of the first collective operation from the local node of the first switch.

8. The first switch of claim 5, wherein receiving the plurality of partial results includes the master collective engine receiving a second response to the collective command from the second switch and the master collective engine providing the second response to the source node, the second response including a second partial result of the first collective operation from a remote node of the second switch.

9. The first switch of claim 8, wherein: the second response includes a third partial result of the first collective operation from a remote node of the third switch based on the third switch providing a third response to the collective command to the second switch and the third response including the third partial result of the first collective operation, and the second response includes a fourth partial result of the first collective operation from a remote node of a fourth switch based on the fourth switch providing a fourth response to the collective command to the third switch, the third switch providing the fourth response to the collective command to the second switch, and the fourth response including the fourth partial result of the first collective operation.

10. The first switch of claim 1, wherein: the configuration information configures the second collective engine to distribute a copy of the replicated collective command to the third switch and to one or more nodes of the second switch; and the configuration information configures the third collective engine to distribute a copy of the replicated collective command to one or more nodes of the third switch.

11. The first switch of claim 1, wherein the configuration information comprises at least one of: a device ID of the local node of the first switch, a device ID of the remote node of the second switch, a participant ID associated with the device ID of the local node, a participant ID associated with the device ID of the remote node, a device ID of a packet engine that is subservient to the first switch, a physical port of an inner-switch link of the first switch, a timeout of the first switch different from a timeout of the second switch, a protocol validation configuration, or an error reporting configuration.

12. The first switch of claim 1, the master collective engine is further configured to: receive, from the source node, an initialization packet, the initialization packet assigning to the first switch a collective group identifier (ID) of the first collective operation; forward a first copy of the initialization packet to the second switch; and forward a second copy of the initialization packet to the local node of the first switch.

13. The first switch of claim 1, wherein: at least one collective engine of the group of collective engines is configured as an addressable endpoint of the first collective operation, the addressable endpoint enables the group of subservient collective engines to determine context ownership of the first collective operation, and the addressable endpoint enables the master collective engine to configure traffic patterns of the first collective operation.

14. The first switch of claim 1, wherein the one or more collective messages comprises at least one of a posted message or a non-posted message.

15. The first switch of claim 1, wherein the first switch further comprises: a second local node subordinate to a source node of a fourth switch that is associated with executing a second collective operation different from the first collective operation, the second local node being configured to provide a partial result of the second collective operation to the source node of the fourth switch.

16. The first switch of claim 15, wherein: the second collective operation is executed concurrently with the first collective operation, and the second local node is configured to receive a final result of the second collective operation from the source node of the fourth switch.

17. A method comprising: communicating, via a source node, configuration information to a group of collective engines, the group of collective engines being configured as a distributed collective engine of a first collective operation, the configuration information indicating the source node is a master node of the first collective operation and that a local node of a first switch and a remote node of a second switch are subordinate to the source node in the first collective operation;

distributing, via the source node, a collective command to the group of collective engines;

receiving, via a master collective engine, the configuration information from the source node; and exchanging, via the master collective engine, one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

18. The method of claim 17, wherein:

communication between the second collective engine and the master collective engine comprises one hop based on the second switch being connected to the first switch, and communication between the third collective engine and the master collective engine comprises two hops based on the third switch connecting to the first switch via the second switch.

19. A non-transitory computer-readable medium storing code that comprises instructions executable by a processor to:

communicate, via a source node, configuration information to a group of collective engines, the group of collective engines being configured as a distributed collective engine of a first collective operation, the configuration information indicating the source node is a master node of the first collective operation and that a local node of a first switch and a remote node of a second switch are subordinate to the source node in the first collective operation;

distribute, via the source node, a collective command to the group of collective engines;

receive, via a master collective engine, the configuration information from the source node; and exchange, via the master collective engine, one or more collective messages of the first collective operation with the group of collective engines of the distributed collective engine in conjunction with execution of the first collective operation, the group of collective engines including the master collective engine and a group of subservient collective engines, the group of subservient collective engines including a second collective engine of the second switch and a third collective engine of a third switch.

20. The non-transitory computer-readable medium of claim 19, wherein:

communication between the second collective engine and the master collective engine comprises one hop based on the second switch being connected to the first switch, and communication between the third collective engine and the master collective engine comprises two hops based on the third switch connecting to the first switch via the second switch.

* * * * *